United States Patent [19]
Suzuki

[11] Patent Number: 5,760,969
[45] Date of Patent: Jun. 2, 1998

[54] COMPACT HIGH-PERFORMANCE ZOOM LENS

[75] Inventor: Takeshi Suzuki, Ebina, Japan

[73] Assignee: Nikon Corporation, Tokyo, Japan

[21] Appl. No.: 547,601

[22] Filed: Oct. 24, 1995

[30] Foreign Application Priority Data

Nov. 1, 1994 [JP] Japan ................... 6-292079

[51] Int. Cl.$^6$ .................................................. G02B 15/16
[52] U.S. Cl. ........................................................ 359/688
[58] Field of Search .................................... 359/688, 683

[56] References Cited

U.S. PATENT DOCUMENTS

| | | | |
|---|---|---|---|
| 4,871,239 | 10/1989 | Masumoto et al. | 359/708 |
| 5,175,648 | 12/1992 | Mori | 359/689 |
| 5,327,290 | 7/1994 | Fukushima et al. | 359/692 |

FOREIGN PATENT DOCUMENTS 56-147113 11/1981 Japan.

Primary Examiner—Scott J. Sugarman
Attorney, Agent, or Firm—Klarquist Sparkman Campbell Leigh & Whinston, LLP

[57] ABSTRACT

A compact, high-performance zoom lens is disclosed comprising four lens groups in a positive-negative-negative-positive refractive power arrangement and capable of imaging an object on an image plane over a range of magnifications from a wide-angle mode to a telephoto mode (preferably spanning a zooming ratio of at least 16). In the most preferred embodiment, the zoom lens comprises, coaxially objectwise to imagewise: a first lens group having positive overall refractive power and comprising four lens elements; a second, axially movable for zooming, lens group having negative overall refractive power and comprising five lens elements including a lens element with an aspherical surface; a third, axially movable for zooming, lens group having negative overall refractive power and comprising two lens elements; and a fourth lens group having positive overall refractive power and comprising ten lens elements. Such a zoom lens preferably satisfies one or more of the following conditions:

$V > 16$ $10^{-4} \cdot (h/2) < d \times 5 < d \times 7 < d \times 10 < 10^{-1} \cdot (h/2)$ $-2.0 < (R_2 + R_1)/(R_2 - R_1) < 0.0$ $0.5 < (F_T/\#)^{1/2} \cdot f_1/f_T < 1.0$ $0.9 < |\beta_{2W}| \cdot V^{1/2} < 1.5$.

30 Claims, 10 Drawing Sheets

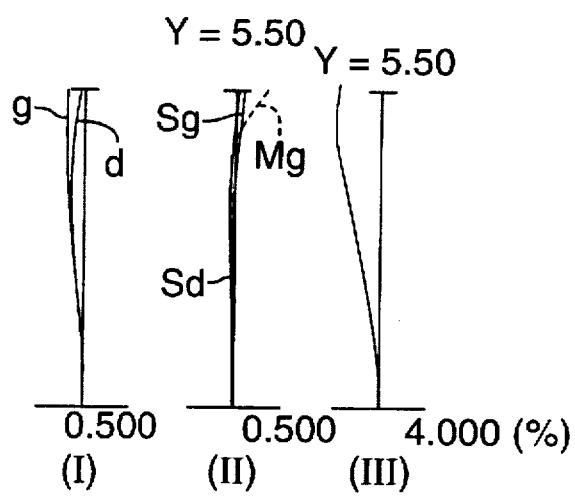
FIG. 2A (WAM)
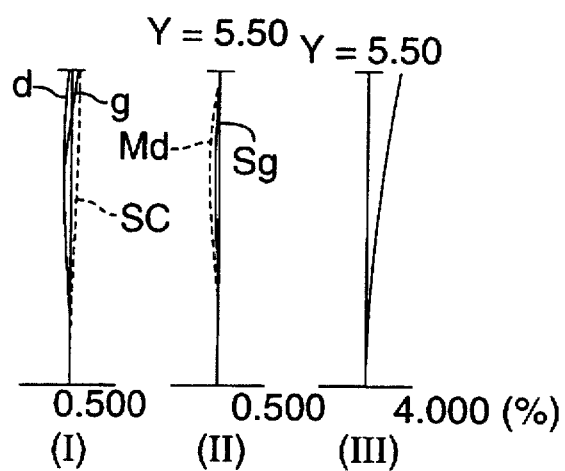
FIG. 2B (MFLM)
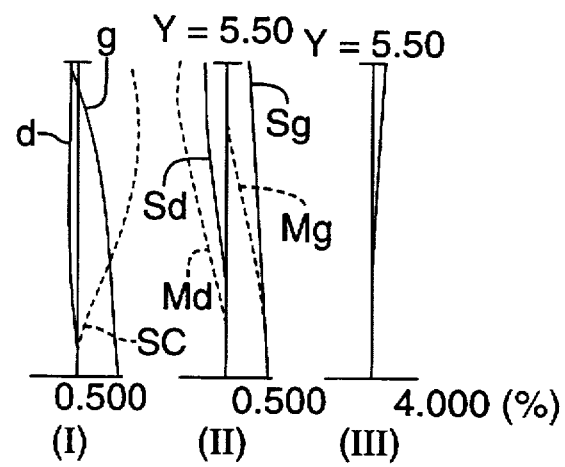
FIG. 2C (TM)

FIG. 4A (WAM)
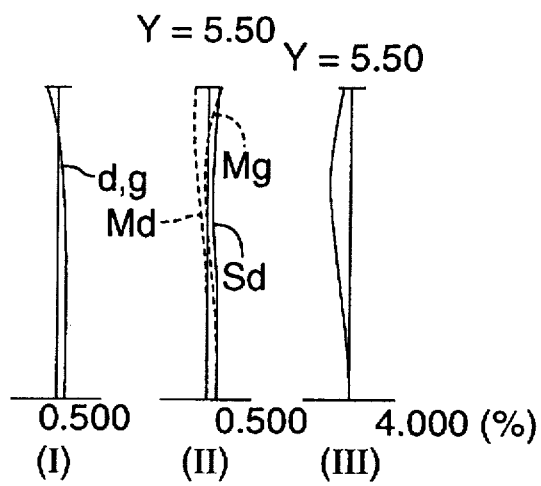
FIG. 4B (MFLM)
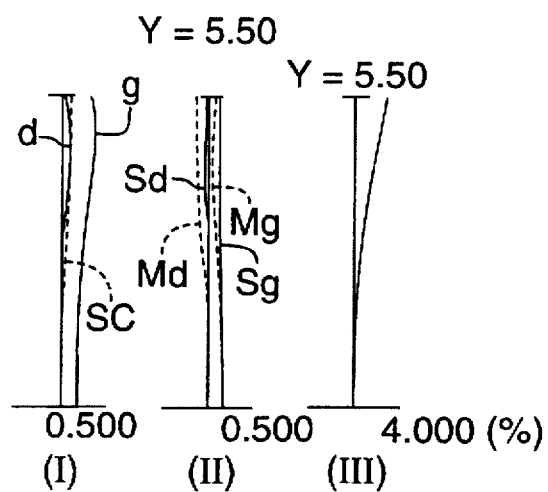
FIG. 4C (TM)
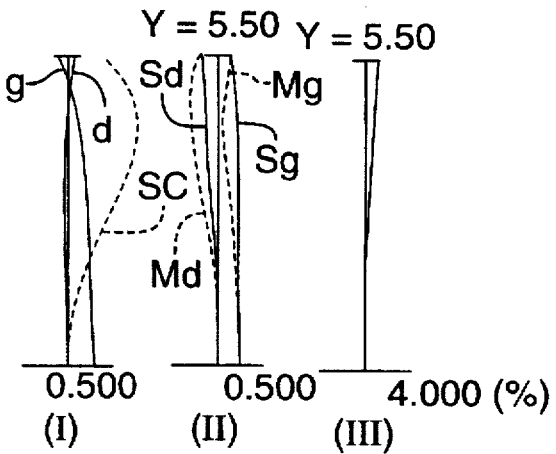

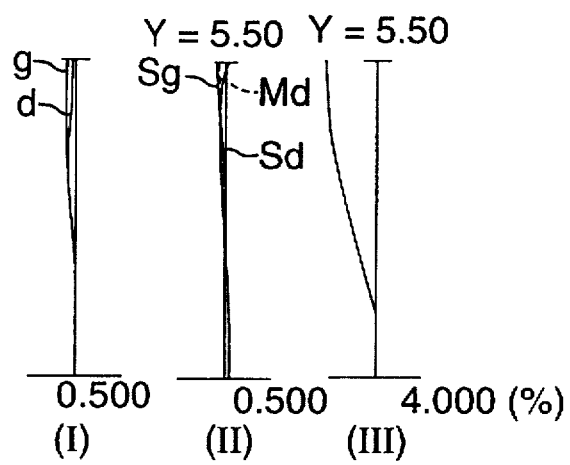
FIG. 6A (WAM)
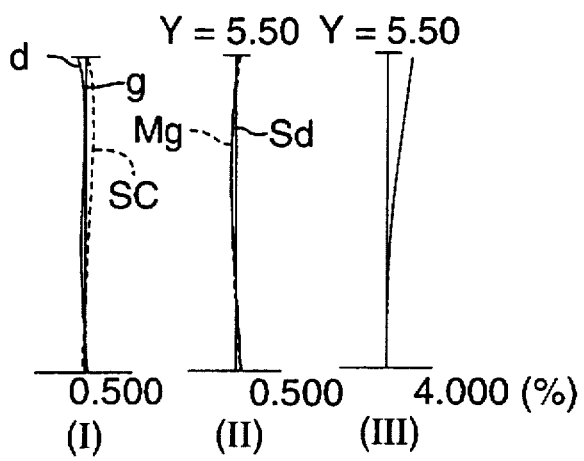
FIG. 6B (MFLM)
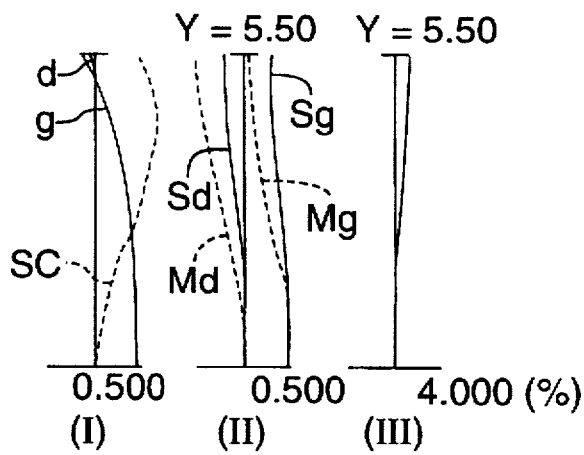
FIG. 6C (TM)

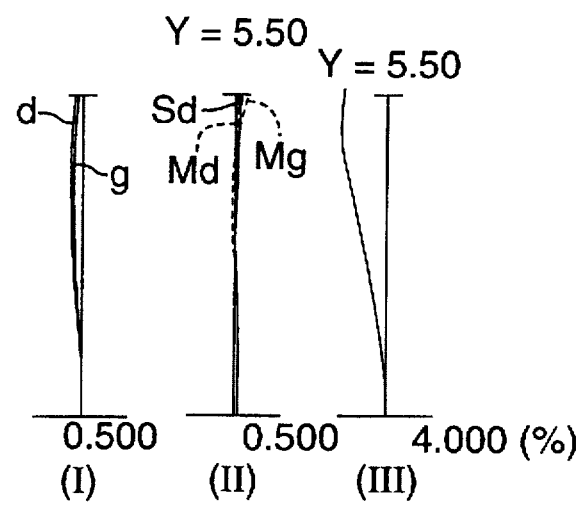
FIG. 8A (WAM)
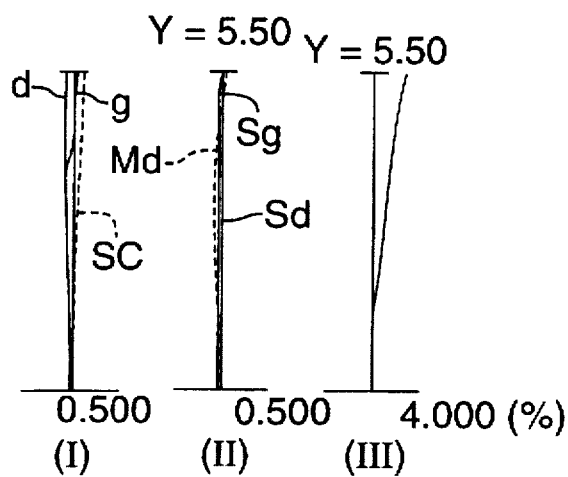
FIG. 8B (MFLM)
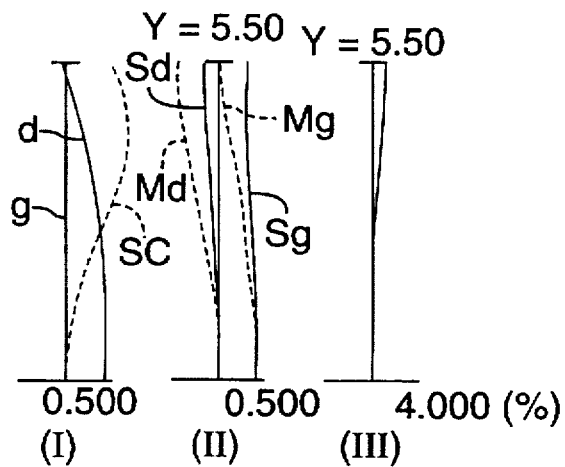
FIG. 8C (TM)

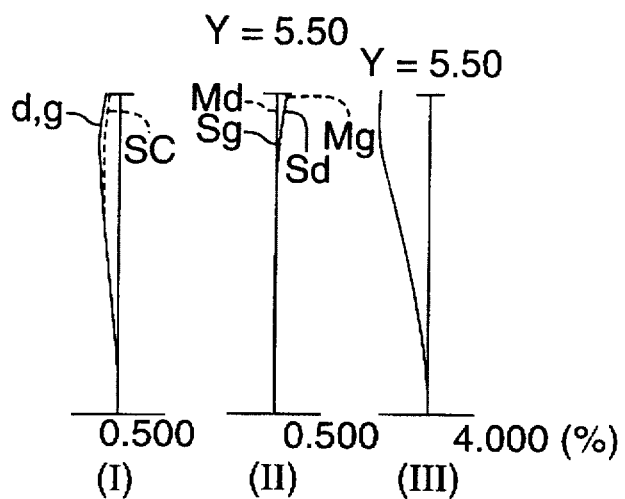
FIG. 10A (WAM)
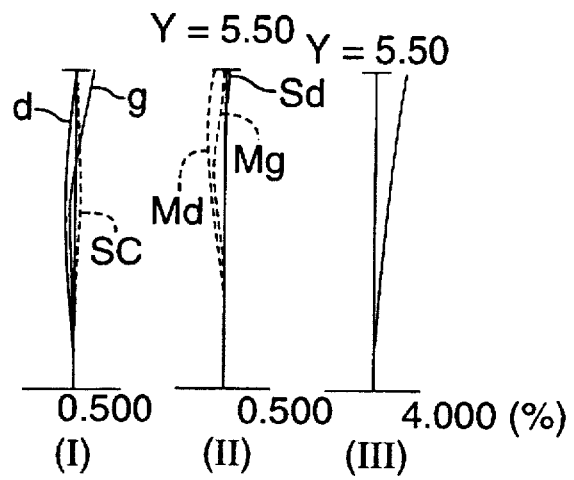
FIG. 10B (MFLM)
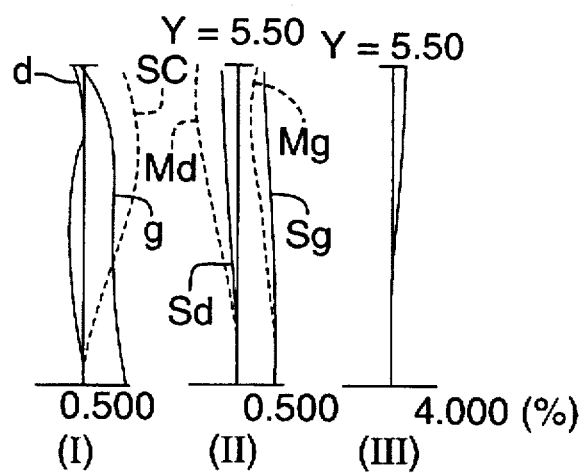
FIG. 10C (TM)

COMPACT HIGH-PERFORMANCE ZOOM LENS

FIELD OF THE INVENTION

This invention relates to zoom lenses, more specifically to zoom lenses having a wide-angle capability and having a positive-negative-negative-positive refractive power arrangement of constituent lens groups.

BACKGROUND OF THE INVENTION

In recent years, video cameras have become extremely popular and the present market trend is toward smaller and more versatile cameras. As video cameras are made smaller and more versatile due to rapid advances in electronic technology, the camera's imaging lens needs to be more compact and light-weight. At the same time, the imaging lens is required to provide, over a large magnification range, a high-quality image to a fixed-size and fixed-position charge-coupled device (CCD) array, which electronically "senses" the light image continuously in real time.

When using a photographic, television or video camera, it is often desirable to have the flexibility to obtain both telephoto and wide-angle images of a subject. In order to obtain images over a wide range of magnifications and fields of view without having to change the imaging lens, a "zoom" imaging lens is often used.

A "zoom" lens has a focal length that can be varied continuously over a defined range to provide variable magnification. Focal-length changes are normally made by moving one or more lens groups in the lens, usually by adjusting the length of the lens barrel. "True" zoom lenses have a parfocal property, i.e., relative motions of the lens groups are coordinated so as to maintain the image formed by the lens in a substantially fixed plane (in contrast to a "vari-focal" zoom lenses, where the image is not maintained in a substantially fixed plane as the focal length is changed). True zoom lenses are normally preferred because they do not need to be refocused after changing the focal length. Differential motion of lens groups is achieved most commonly through the use of one or more high-precision cams in the lens barrel.

Conventional zoom lenses generally comprise an objectwise front section comprising a Donders-type afocal telescope of variable power, and a rear section comprising an objective lens of fixed power (which may be a pre-existing camera lens onto which the afocal telescopic zoom attaches). Conventional mechanically-compensated zoom lenses that include an objective lens group tend to be axially long, especially if the zoom lens exhibits a wide focal-length range in magnification between wide-angle and telephoto modes (i.e., a large "zoom ratio"). Moreover, the length of the zoom lens can be even longer if it is necessary to accommodate an imagewise component such as a beam splitting prism, a color-separating means, or band-pass filters.

For a zoom lens that is designed for use with a color-separating prism and/or parallel plate band-pass filters, it is desirable that the lens be substantially "image-space telecentric," meaning that the principal rays leaving the exit pupil are substantially parallel to the optical axis. Substantial image-space telecentricity is preferred because the optimum performance of color-separating prisms and band-pass filters is achieved only over a limited range of incident ray angles. A significant variation in incident ray angles can result in a variation in color over the image plane called "color shading."

Most conventional zoom lenses having a large aperture and a high zoom ratio employ four or five groups of lenses in a positive-negative-negative-positive or positive-negative-positive-positive refractive power arrangement. Typically, this arrangement allows for the overall zoom-lens refractive power to be sufficiently spread out over the lens groups so as to facilitate aberration correction, and to provide for substantially parallel principal rays between the axially movable lens groups(s) (i.e., "zoom groups") and the stationary objective group. In addition, the lens elements comprising the telescopic front objective lens group tend have a large clear aperture so as to gather sufficient light to form a bright image over the entire range of magnifications, which is of particular importance in video camera imaging.

A five-group zoom lens having a positive-negative-negative-positive-positive arrangement is described in U.S. Pat. No. 5,061,051 (the '051 patent) to Miyamae. However, this zoom lens has insufficient back focus to accommodate a large (i.e., 40 mm) color-separating prism. Further, the lens does not have a suitably high zoom ratio or suitably large range of field angles from the wide-angle to the telephoto mode.

In order to make a conventional four-group zoom lens more compact while at the same time increasing the zoom ratio, the conventional approach has been to increase the power of each of the lens groups. However, this approach can only be taken so far before aberration correction becomes problematic and the zoom-lens performance is compromised. On the other hand, the alternative approach of including additional lens groups to spread the power in order to facilitate aberration correction is disadvantageous because a compact design becomes difficult to achieve.

Aspherical lenses ("aspheres") have also been used to construct compact, high-power zoom lenses. Aspheres offer advantages in the way of aberration correction, permitting a relatively high-power zoom lens without the need for additional lens groups. Furthermore, recent advances in asphere production technology has made the use of aspheres economical in many types of zoom lenses.

Zoom lenses utilizing aspheres are shown in U.S. Patent No. 5,327,290 to Fukushima et al., U.S. Pat. No. 5,175,648 to Mori et al., and U.S. Pat. No. 4,871,239 to Masumoto et al. While these zoom lenses are compact, they do not have suitably high zoom ratios from the wide-angle mode to the telephoto mode, limiting their usefulness in demanding still and motion-picture camera applications.

Therefore, there is a need for a compact, lightweight, high-performance camera zoom lens with a large aperture and a high zoom ratio.

SUMMARY OF THE INVENTION

The present invention satisfies the foregoing need by providing a compact, lightweight, high-performance zoom lens capable of being zoomed over a focal-length range from a wide-angle mode to a telephoto mode at a high zooming ratio.

According to one aspect of the present invention, a zoom lens is provided comprising a first, second, third, and fourth lens groups disposed objectwise to imagewise along an optical axis. The second and third lens groups are axially movable for zooming over a zooming ratio of at least 16 from a wide-angle mode to a telephoto mode. The second lens group comprises an aspherical lens element having a maximum effective diameter h and an aspherical lens surface having departure distances $d\times 5$, $d\times 7$, and $d\times 10$, satisfying the relationship:

$$10^{-4} \cdot (h/2) < |d \times 5| < |d \times 7| < |d \times 10| < 10^{-1} \cdot (h/2).$$

Preferably, the first lens group in such a zoom lens has a focal length $f_1$, the second lens group has a lateral magnification $\beta_{2W}$ in the wide-angle mode, and the telephoto mode has a focal length $f_T$ and an F-number $F_T/\#$, wherein the zoom lens satisfies at least one of the following conditions:

$$0.5 < (F_T/\#)^{1/2}(f_1/f) < 1.0;$$

and $$0.9 < |\beta_{2W} \cdot V^{1/2}| < 1.5.$$

Also preferably, such a zoom lens comprises a most objectwise lens element having an objectwise spherical surface with radius of curvature $R_1$ and an imagewise spherical surface with radius of curvature $R_2$ satisfying the relationship:

$$-2.0 < (R_2+R_1)/(R_2-R_1) < 0.0.$$

In a zoom lens as summarized in the preceding paragraph, the fourth lens group preferably comprises an objectwise lens subgroup having positive refractive power and an imagewise lens subgroup having positive refractive power. Also, an aperture stop can be disposed in the fourth lens group.

According to yet another aspect of the present invention, a zoom lens is provided comprising, objectwise to imagewise along an optical axis, first, second, third, and fourth lens groups. The first lens group has a positive refractive power. The second lens group has a negative refractive power, and is axially movable over a zooming range from a wide-angle mode to a telephoto mode. The third lens group has a negative refractive power and preferably comprises a compound lens. The fourth lens group has positive refractive power and preferably comprises an objectwise lens subgroup and an imagewise lens subgroup. The zoom lens includes at least one lens element having an aspherical surface with a maximum effective diameter h and aspherical lens-surface departure distances of d×5, d×7, and d×10. Such a zoom lens satisfies at least one of the following conditions:

$$10^{-4} \cdot (h/2) < |d \times 5| < |d \times 7| < |d \times 10| < 10^{-1} \cdot (h/2);$$

$$0.5 < (F_T/\#)^{1/2}(f_1/f_T) < 1.0;$$

and $$0.9 < |\beta 2_W \cdot V^{1/2}| < 1.5.$$

Preferably, in such a zoom lens, the first lens group comprises a most imagewise lens element having an objectwise surface with a radius of curvature $R_1$ and an imagewise surface with a radius of curvature $R_2$, wherein the radii of curvature satisfy the condition:

$$-2.0 < (R_2+R_1)/(R_2-R_1) < 0.0.$$

Such a zoom lens preferably has a zoom ratio V of at least 16.

According to yet another aspect of the present invention, a zoom lens is provided for use with a camera. The zoom lens comprises first, second, third, and fourth lens groups having positive, negative, negative, and positive refractive powers, respectively. The first lens group comprises at least one positive lens element and a most imagewise negative lens element having an objectwise surface with radius of curvature $R_1$ and an imagewise surface with radius of curvature $R_2$. The second lens group comprises an aspherical lens element having an aspherical surface having maximal effective diameter h and departure distances of d×5, d×7, and d×10. The third lens group comprises a compound lens. The second and third lens groups are axially movable over respective zooming ranges from a wide-angle mode to a telephoto mode so as to provide the zoom lens with a zoom ratio V. Such a zoom lens satisfies at least one of the following conditions:

$$V > 16;$$

$$10^{-4} \cdot (h/2) < |d \times 5| < |d \times 7| < |d \times 10| < 10^{-1} \cdot (h/2);$$

$$-2.0 < (R_2+R_1)/(R_2-R_1) < 0.0;$$

$$0.5 < (F_T/\#)^{1/2}(f_1/f_T) < 1.0;$$

and $$0.9 < |\beta_{2W} \cdot V^{1/2}| < 1.5.$$

The zoom lens also preferably has an aperture stop disposed coaxially imagewise of a first objectwise lens element in the fourth lens group, and a cam operably engaged with the second and third lens groups for effecting coordinated zooming movements of the second and third lens groups. Also preferably, the compound lens in the third lens group includes, objectwise to imagewise, a biconcave lens element and a biconvex lens element, and the fourth lens group has an objectwise lens subgroup comprising a first compound lens and an imagewise lens subgroup comprising a second compound lens.

According to yet another aspect of the present invention, a zoom lens is provided that is capable of providing an image of an object at an image plane over a range of focal lengths from a wide-angle mode to a telephoto mode. The zoom lens comprises, objectwise to imagewise, first, second, third, and fourth lens groups having overall positive, negative, negative, and positive refractive power, respectively. The first lens group comprises a negative lens element and at least three positive lens elements, wherein the most imagewise lens element of the first group has an objectwise surface with a radius of curvature $R_1$ and an imagewise surface with a radius of curvature $R_2$. The second lens group comprises at least five lens elements at least one of which having an aspherical surface. The third lens group comprises two lens elements. The fourth lens group comprises ten lens elements preferably distributed between an objectwise lens subgroup and an imagewise lens subgroup. The zoom lens satisfies the condition:

$$0.5 < (F_T/\#)^{1/2}(f_1/f_T) < 1.0.$$

Preferably, such a zoom lens has an aperture stop located in the fourth lens group. Further preferably, the zoom lens satisfies one or more of the following conditions:

$$0.9 < |\beta 2_W \cdot V^{1/2}| < 1.5;$$

and $$-2.0 < (R_2+R_1)/(R_2-R_1) < 00.$$

The first lens group can comprise, objectwise to imagewise, a negative meniscus lens element with an objectwise convex surface, first and second biconvex lens elements, and a positive meniscus lens element having an objectwise convex surface. The second lens group can comprise, objectwise to imagewise, a negative biconcave lens element, a compound lens including a negative meniscus lens element and a biconcave lens element having an objectwise aspherical surface, an aspherical biconvex lens element, and a negative meniscus lens element having a concave objectwise surface. The third lens group can comprise a compound lens including a biconcave lens element and a biconvex lens element. Finally, the fourth lens group can comprise, objectwise to imagewise, (i) a positive meniscus lens element having an imagewise convex surface, (ii) a first biconvex lens element, (iii) a second biconvex element, (iv) a first negative meniscus lens element having an imagewise convex surface, (v) a third biconvex lens element, (vi) a first compound lens including a biconcave lens element and a fourth biconvex lens element, (vii) a second compound lens including one of (1) a fifth biconvex lens element and a second negative meniscus lens element having an objectwise concave surface, and (2) a second negative meniscus lens element having an objectwise convex surface and a fifth biconvex lens element, and (viii) a sixth biconvex lens element. Further preferably, the second lens group comprises, objectwise to imagewise, a negative biconcave lens element, a first compound lens including a negative meniscus lens element and a biconcave lens element having an objectwise aspherical surface, and a second compound lens including an aspherical biconvex lens element cemented to a negative meniscus lens element having a concave objectwise surface.

According to yet another aspect of the present invention, combinations are provided including a zoom lens as summarized above and sensing means (such as a CCD array) disposed so as to sense an image produced at an image plane by the zoom lens. Such combinations can include a color-separating prism or other optical component situated between the zoom lens and the image plane.

According to yet other aspects of the present invention, zoom lenses are provided corresponding to any of several Working Examples disclosed herein.

BRIEF DESCRIPTION OF THE DRAWINGS

FIG. 2(A)(I)–2(A)(III) are plots of spherical aberration, astigmatism, and distortion, respectively, for Working Example 1, wide-angle mode (WAM).

FIG. 2(B)(I)–2(B)(III) are plots of spherical aberration, astigmatism, and distortion, respectively, for Working Example 1, mid-focal length mode (MFLM).

FIG. 2(C)(I)–2(C)(III) are plots of spherical aberration, astigmatism, and distortion, respectively, for Working Example 1, telephoto mode (TM).

FIG. 4(A)(I)–4(A)(III) are plots of spherical aberration, astigmatism, and distortion, respectively, for Working Example 2, wide-angle mode (WAM).

FIG. 4(B)(I)–4(B)(III) are plots of spherical aberration, astigmatism, and distortion, respectively, for Working Example 2, mid-focal length mode (MFLM).

FIG. 4(C)(I)–4(C)(III) are plots of spherical aberration, astigmatism, and distortion, respectively, for Working Example 2, telephoto mode (TM).

FIG. 6(A)(I)–6(A)(III) are plots of spherical aberration, astigmatism, and distortion, respectively, for Working Example 3, wide-angle mode (WAM).

FIG. 6(B)(I)–6(B)(III) are plots of spherical aberration, astigmatism, and distortion, respectively, for Working Example 3, mid-focal length mode (MFLM).

FIG. 6(C)(I)–6(C)(III) are plots of spherical aberration, astigmatism, and distortion, respectively, for Working Example 3, telephoto mode (TM).

FIG. 8(A)(I)–8(A)(III) are plots of spherical aberration, astigmatism, and distortion, respectively, for Working Example 4, wide-angle mode (WAM).

FIG. 8(B)(I)–8(B)(III) are plots of spherical aberration, astigmatism, and distortion, respectively, for Working Example 4, mid-focal length mode (MFLM).

FIG. 8(C)(I)–8(C)(III) are plots of spherical aberration, astigmatism, and distortion, respectively, for Working Example 4, telephoto mode (TM).

FIG. 10(A)(I)–10(A)(III) are plots of spherical aberration, astigmatism, and distortion, respectively, for Working Example 5, wide-angle mode (WAM).

FIG. 10(B)(I)–10(B)(III) are plots of spherical aberration, astigmatism, and distortion, respectively, for Working Example 5, mid-focal length mode (MFLM).

FIG. 10(C)(I)–10(C)(III) are plots of spherical aberration, astigmatism, and distortion, respectively, for Working Example 5, telephoto mode (TM).

DETAILED DESCRIPTION

Figure 1:
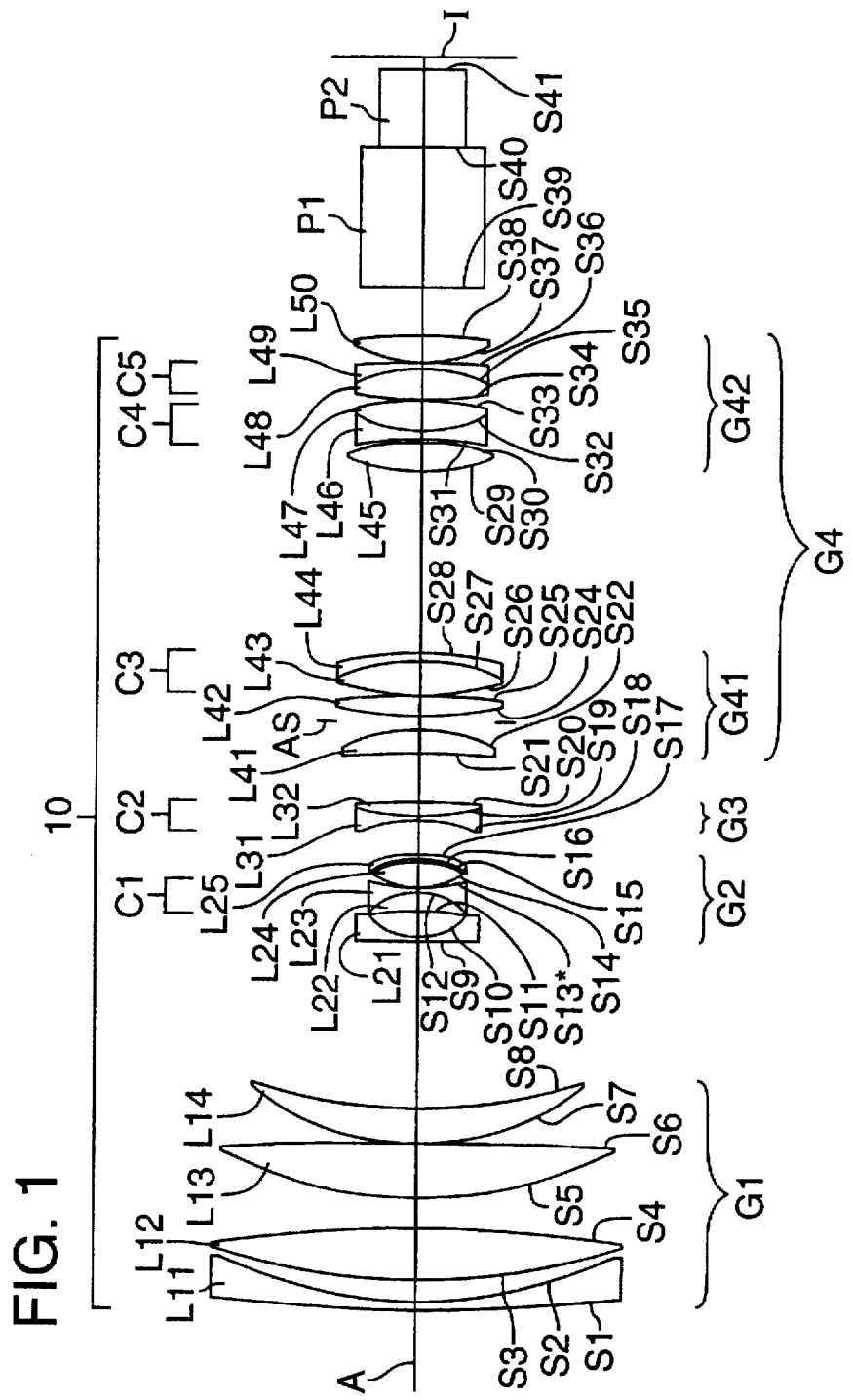
FIG. 1 is an optical diagram of the embodiment of Working Example 1.

The following expressions, terms and conventions are used herein:

In an optical diagram, light travels left to right from object to image.

A "positive" distance or direction along an optical axis extends from left to right (i.e., objectwise to imagewise); a "negative" distance or direction extends from right to left (i.e. imagewise to objectwise).

The "radius of curvature" of an optical surface (such as the surface of a lens element) is "positive" when the center of curvature lies to the right of the surface, and "negative" when it lies to the left of the surface.

A "planar" optical surface has infinite radius.

The "wide-angle mode" (abbreviated "WAM") describes the configuration of the lens groups comprising the zoom lens when the lens is used as a wide-angle lens.

The "telephoto mode" (abbreviated "TM") describes the configuration of the lens groups comprising the zoom lens when the lens is used as a telephoto lens.

The "mid-focal length mode" (abbreviated "MFLM") describes the configuration of the lens groups comprising the zoom lens when the lens is used in between the extreme wide-angle and extreme telephoto modes.

The "field angle" $2\omega$ is equal to the twice the angle $\omega$ subtended by the principal ray and the optical axis, as measured at the entrance pupil, for the principal ray intersecting the image plane at the edge of the image field (e.g., the edge of the CCD array). The field angle is largest in the extreme wide-angle mode.

"Lateral magnification" is the ratio of the image height h' to the object height h, wherein h and h' are measured in a direction perpendicular (i.e., "laterally") with respect to the optical axis.

The "zoom ratio" (V) is the ratio of the zoom-lens magnification in the telephoto mode to the zoom-lens magnification in the wide-angle mode.

The "magnification ratio" (v) of a lens group is the ratio of the effective lateral magnification of the individual lens group in the wide-angle mode to the effective lateral magnification of the individual lens group in the telephoto mode.

The "Abbe number" ($V_d$) is the ratio $(n_D-1)/(n_F-n_C)$, where $n_D$ is the index of refraction in D-line light (587.6 nm wavelength), $n_F$ is the index of refraction in F-line light (486.1 nm wavelength) and $n_C$ is the index of refraction in C-line light (656.3 nm wavelength).

The "back focus" ($B_f$) is the distance along the optical axis between the lens surface closest to the image and the image.

"Telecentric" (in image-space) means that the principal rays leaving the exit pupil are parallel to the optical axis.

The "clear aperture" is the diameter of a lens element or aperture stop.

"Linear" axial motion of a lens element or group means motion at a constant velocity along the optical axis.

"Non-linear" axial motion of a lens element or group means motion at a non-constant, i.e., time-varying, velocity along the optical axis.

"High-performance imaging" is a term of art meaning that optical aberrations of the subject lens are corrected to a degree suitable for the particular imaging application.

"Maximum effective diameter" (h) is the maximum diameter from the optical axis at which a aspherical lens surface suitably controls aberrations in the zoom lens.

"Aspherical lens surface departure distance" (d×5, d×7, d×10) refers to the axial distance between the aspherical surface and a spherical reference surface that is centered on the optical axis and touches the aspherical surface at the optical axis. The designations d×5, d×7, and d×10, respectively, refer to positions on the aspherical surface at heights of 50%, 70% and 100% of the maximum effective diameter of the respective lens element.

The present invention provides, inter alia, a compact, light-weight, high-performance, mechanically compensated high-zoom-ratio zoom lens suitable for use with a still or motion-picture (e.g., television or video) camera.

FIG. 1 depicts an optical diagram of a representative embodiment 10 of the present invention showing the constituent lens elements and relative positions of the constituent lens groups in the wide-angle mode (WAM). The zoom lens 10, according to the invention, is comprised of the following lens groups, arranged coaxially objectwise to imagewise along the optical axis A: (a) a first lens group G1 having positive refractive power; (b) a second lens group G2 having negative refractive power and including, preferably, at least one lens element with an aspherical surface; (c) a third lens group G3 having negative refractive power; and (d) a fourth lens group G4 having positive refractive power.

The lens groups G2 and G3 are preferably axially movable; their coordinated movements are used to effectuate a change in magnification (i.e., focal length) while maintaining the image plane I at a substantially fixed position. As the lens is zoomed from the telephoto mode to the wide-angle mode, lens group G2 generally moves linearly objectwise along the optical axis A, while lens group G3 generally moves non-linearly (i.e., first objectwise, and then imagewise) along the optical axis A. Lens groups G1 and G4 generally remain stationary during zooming. However, lens group G1 can be moved axially for focusing.

The provision of the aspherical lens surface (e.g., surface S13 in FIG. 1) in the second lens group G2 effectively corrects aberrations in the various lens groups G1, G2, G3, G4 of the zoom lens 10. The aspherical surface can be formed to have a positive refractive power that gradually increases radially from the optical axis A toward the aspherical surface circumference, or to have a negative refractive power that gradually decreases radially from the optical axis A toward the aspherical surface circumference.

Several conditions are preferably met in order to obtain the best imaging performance from the zoom lens while simultaneously providing a large zoom ratio and maintaining compactness of the zoom lens, in accordance with the present invention.

The first condition pertains to a lower limit of the zoom ratio of the zoom lens, and is expressed as:

$$V > 16 \tag{1}$$

The V>16 of condition (1) establishes an exceptionally high zoom ratio, which is achieved with the large aperture, low aberrations, and lens-system compactness established by the other conditions set forth below. Thus, the present zoom lens, when used with a still or motion-picture camera, produces high-performance imaging throughout an extremely wide range of imaging requirements.

The second condition sets forth the shape of the aspherical lens surface in the second lens group. The condition is expressed as follows:

$$10^{-4} \cdot (h/2) < |d \times 5| < |d \times 7| < |d \times 10| < 10^{-1} \cdot (h/2) \tag{2}$$

Condition (2) stipulates surface-shape conditions for the asphere that provide adequate correction of aberrations in the zoom lens as a whole so as to provide high-performance imaging, while providing for inexpensive manufacture of the aspherical lens surface. As discussed above, both positive refractive power aspherical lens surfaces and negative refractive power aspherical lens surfaces may be formed under condition (2).

If the departure distance $|d \times 10|$ were to exceed the upper limit of $10^{-1} \cdot (h/2)$, then barrel-type distortion of the zoom lens would exceed acceptable limits from the mid-focal length mode (MFLM) to the telephoto mode (TM).

If the departure distance $|d \times 5|$ were to be below the lower limit of $10^{-4} \cdot (h/2)$, then various aberrations of the zoom lens, in particular field curvature (Petzval sum), would be at unacceptable levels throughout the range of magnification from the wide-angle mode (WAM) to the telephoto mode (TM). In addition, overcorrection of spherical aberration would occur in the telephoto mode.

Even if the upper and lower limits of condition (2) were not violated, spherical aberrations and coma would increase to unacceptable levels in the zoom lens if the aspherical surface shape were to depart from the relationship $|d \times 5| < |d \times 7| < |d \times 10|$.

The third condition relates to the shape of the most objectwise lens L11 preferably in the first lens group G1 (see, e.g., FIG. 1). Lens element L11 preferably has a negative meniscus shape with a convex objectwise surface S1. Lens element L11 plays an important role in correcting pin-cushion distortion and spherical aberration in the zoom lens. The condition is expressed as:

$$-2.0 < (R_2 + R_1)/(R_2 - R_1) < 0.0 \tag{3}$$

wherein $R_1$ and $R_2$ are the radii of curvature of the objectwise and imagewise surfaces S1, S2, respectively, of lens element L11.

If $(R_2 + R_1)/(R_2 - R_1)$ were to exceed the upper limit of condition (3), then spherical aberration would be undercorrected in the telephoto mode, thereby degrading the quality of the focused image. To correct such spherical aberration, the shape of the aspherical lens surface could be suitably modified. However, the aspherical surface departure distance required to correct such spherical aberration would be so large that the aspherical surface manufacture would be difficult and expensive.

If $(R_2+R_1)/(R_2-R_1)$ were to be below the lower limit of condition (3), then barrel-type distortion would arise in the zoom lens to a level that could not be readily eliminated.

The fourth condition provides for a compact variable magnification zoom lens while maintaining imaging performance. The condition is expressed as:

$$0.5<(F_T/\#)^{1/2}(f_1/f_T)<1.0 \quad (4)$$

wherein $F_T/\#$ is the F-number (inverse relative aperture) of the zoom lens in the telephoto mode, $f_1$ is the focal length of first lens group G1, and $f_T$ is the overall focal length of the zoom lens in the telephoto mode. It is understood that the $F_T/\#$ is generally equal to $f_T/D$, (wherein "D" denotes the clear aperture of the lens). Accordingly, $(F_T/\#)^{1/2}(f_1/f_T)=f_1/(d\cdot(f_T)^{1/2})$. Thus, the value of $f_1$ tends to determine the value of the condition $(F_T/\#)^{1/2}(f_1/f_T)$.

If $(F_T/\#)^{1/2}(f_1/f_T)$ were to exceed the upper limit of condition (4) due to the focal length $f_1$ of the first lens group G1 being relatively large, the corresponding weak refractive power of the first lens group G1 would result in the total zoom-lens focal length being unacceptably large. Consequently, achieving a compact zoom-lens configuration would be difficult.

If $(F_T/\#)^{1/2}(f_1/f_T)$ were to be below the lower limit of condition (4) due to the first lens group G1 having a relatively short focal length $f_1$, then a compact zoom-lens configuration would be achievable. However, the corresponding high refractive power for the first lens group G1 would unacceptably increase the difficulty of aberration correction and would cause unacceptably diminished imaging performance of the zoom lens.

More specifically, the Petzval sum of the zoom lens (which is proportional to the lens power) would increase and the F/# of the zoom lens would decrease. Consequently, it would be difficult to correct for spherical aberration when the zoom lens is used in the telephoto mode. Moreover, the manufacturing tolerances of the lens design would become exceedingly tight and unforgiving, so that small deviations in the centering of the lens elements, in the sphericity of the spherical lens surfaces, and in the asphericity of the aspherical lens surface would result in greatly diminished imaging performance of the zoom lens.

The fifth condition relates the magnifying power of the second lens group G2 to an overall zoom-lens configuration that is compact and provides an acceptably low Petzval sum. The fifth condition is expressed as:

$$0.9<|\beta_{2W}\cdot V^{1/2}|<1.5 \quad (5)$$

wherein $\beta_{2W}$ is the lateral magnification of lens group G2 in the extreme wide-angle mode (i.e., when lens group G2 is at its most objectwise position), and V is the zoom ratio, which is typically expressed as "V:1" (for example, a zoom ratio of 3:1 means that V=3).

Condition (5) indicates that the Petzval sum of a zoom lens according to the present invention is strongly governed by the refractive power of the second lens group G2, which generally has the highest refractive power of all of the lens groups in the zoom lens. Thus, minimizing the negative refractive power of the second lens group G2 is very effective in minimizing the Petzval sum.

If $|\beta_{2W}\cdot V^{1/2}|$ were to exceed the upper limit of condition (5), then the axial distance over which the second lens group G2 must move to achieve a given lateral magnification would be excessive. Such an increase in the axial movement distance of the second lens group G2 would necessitate an excessive increase in the differential motion of the third lens group G3. Consequently, an unacceptably complex cam drive system would be required to move the lens groups G2 and G3. Also, an undesirable increase in the overall length and in the clear aperture of the zoom lens would be required, thereby adversely affecting axial and diametrical compactness of the zoom lens.

If $|\beta_{2W}\cdot V^{1/2}|$ were to be below the lower limit of condition (5), then the power of lens group G2 would be excessively strong. Consequently, aberrations (particularly the Petzval sum) would be unacceptably difficult to control.

To achieve a large aperture ratio with acceptable aberration levels in a high-performance zoom lens according to the present invention, the third lens group G3 preferably has (as shown, for example, in FIG. 1), objectwise to imagewise: a negative compound lens C2 including a biconcave lens element L31 and a biconvex lens element L32. In addition, the fourth lens group G4 preferably has, objectwise to imagewise: an objectwise lens subgroup G41 having at least one compound lens C3, 15 and an imagewise lens group G42 having at least one compound lens C4, C5.

WORKING EXAMPLES

The following Working Examples 1–5 pertain to representative zoom-lens embodiments of a zoom lens according to the present invention. The embodiment of each Working Example comprises, in sequence coaxially objectwise to imagewise, the following components (see, e.g., FIG. 1): a first lens group G1 having positive 25 overall refractive power, a second lens group G2 having negative overall refractive power, a third lens group G3 having negative overall refractive power, and a fourth lens group G4 having positive overall refractive power.

In addition, a color-separating prism P1, used to separate red, green and blue light to form the three primary color signals, is optionally situated coaxially imagewise relative to lens group G4. Also, parallel plates P2 can be disposed coaxially imagewise relative to the color-separating prism P1. The parallel plates P2 are representative of various types of bandpass filters that can be employed in order to optimize the performance of a CCD array disposed at the image plane I. The color-separating prism Pi and parallel plates P2 be included with the zoom lens 10 in order to better correct for aberrations under certain conditions of use, particularly when the zoom lens is used with a motion-picture camera.

Further referring to FIG. 1, the zoom lens 10 can be zoomed from an extreme wide-angle mode to an extreme telephoto mode by axially moving lens group G2 in a linear manner along the optical axis A in coordination with a non-linear axial movement of lens group G3. Lens groups G1 and G4 normally remain stationary during zooming.

Each Working Example is set forth in detail in Tables 1 through 20, wherein the following variables, in addition to those defined in conditions (1) through (5), above, are used:

f=overall focal length of the zoom lens
F/#=F-number
2ω=field angle in the extreme wide-angle mode
S=surface number, numbered from objectwise to imagewise
R=radius of curvature of a corresponding lens-element surface, in millimeters d=distance between adjacent lens element surfaces, in millimeters n=refractive index at the D-line ($\lambda$=587.6 nanometers)

$V_d$=Abbe number of a corresponding lens element $B_f$=back focus

In Tables 1, 5, 9, 13 and 17, an aspherical surface is indicated by a "*" adjacent the corresponding surface number, and the radius of curvature given in each table for an aspheric surface is the radius of curvature for the reference spherical surface. The shape of an aspherical surface is expressed as:

$$X(y) = \{(y^2/r)/[1+(1-ky^2/r^2)^{1/2}]\} + C_2y^2 + C_4y^4 + C_6y^6 + C_8y^8 + C_{10}y^{10} + \ldots \quad [\text{Eq. 1}]$$

wherein y is the height of the aspherical lens surface as measured in a direction perpendicular to the optical axis A, r is the radius of curvature of the reference spherical surface, k is the conic coefficient, and $C_n$ is the nth order aspheric coefficient. The function X(y) of Eq. 1 describes the axial distance of the aspheric surface relative to a reference sphere centered on the optical axis and touching the surface of the sphere on the optical axis. In Eq. 1, only even powers of y appear due to the axial symmetry of the aspherical surface.

FIGS. 2A–2C, 4A–4C, 6A–6C, 8A–8C, 10A–10C are aberration plots for respective working examples 1–5, wherein FIGS. 2A, 4A, 6A, 8A, and 10A pertain to the wide-angle (i.e., short focal length, low magnification) mode; FIGS. 2B, 4B, 6B, 8B, and 10B pertain to the mid-focal length (intermediate focal length, intermediate magnification) mode; and FIGS. 2C, 4C, 6C, 8C, and 10C pertain to the telephoto (i.e., long focal length, high magnification) mode.

In FIGS. 2A(I), 2B(I), 2C(I), 4A(I), 4B(I), 4C(I), 6A(I), 6B(I), 6C(I), 8A(I), 8B(I), 8C(I), 10A(I), 10B(I), and 10C(I), "D" denotes the D-line wavelength of 587.6 nanometers, and "G" denotes the G-line wavelength of 435.8 nanometers. The dashed lines represent the respective sine conditions.

In FIGS. 2A(II), 2B(II), 2C(II), 4A(II), 4B(II), 4C(II), 6A(II), 6B(II), 6C(II), 8A(II), 8B(II), 8C(II), 10A(II), 10B(II), and 10C(II), "D" denotes the d-line wavelength of 587.6 nanometers, "G" denotes the g-line wavelength of 435.8 nanometers, and "Y" is the final image height. The solid lines denote the sagittal image surface and the dashed lines denote the meridional image surface.

In FIGS. 2A(III), 2B(III), 2C(III), 4A(III), 4B(III), 4C(III), 6A(III), 6B(III), 6C(III), 8A(III), 8B(III), 8C(III), 10A(III), 10B(III), and 10C(III), "Y" is the final image height.

Working Example 1

An embodiment 10 of a Working Example 1 is shown in FIG. 1 in the extreme wide-angle mode. The first lens group G1 comprises a negative meniscus lens element L11 having an objectwise convex surface S1, a bi-convex lens element L12, a bi-convex lens element L13, and a positive meniscus lens element L14 having an objectwise convex surface S7.

The second lens group G2 comprises a negative meniscus lens element L21 having an objectwise convex surface S9, a compound lens C1 including a positive meniscus lens element L22 with an objectwise concave surface S11 and a bi-concave lens element L23, a bi-convex lens element L24, and a negative meniscus lens element L25 with an objectwise concave surface S16.

The third lens group G3 comprises a compound lens C2 comprising a bi-concave lens element L31 and an bi-convex lens element L32.

The fourth lens group G4 comprises an objectwise lens subgroup G41 comprising a positive meniscus lens element L41 with an objectwise concave surface S21, an aperture stop AS, a biconvex lens element L42, and a compound lens C3 including a biconvex lens element L43 and a negative meniscus lens element L44 with a cemented objectwise concave surface S27.

The fourth lens group G4 further comprises an imagewise lens subgroup G42 comprising a bi-convex lens element L45, a first compound lens C4 including a bi-concave lens element L46 and a bi-convex lens element L47, a second compound lens C5 including a bi-convex lens element L48 and a negative meniscus lens element L49 having a cemented objectwise concave surface S35, and a bi-convex lens element L50.

With respect to this Working Example, the various optical parameters are listed in Tables 1–4, below.

TABLE 1 f = 8.3–40–174.3 mm (WAM to MFLM to TM)

| S | R | D | $V_d$ | n |
|---|---|---|---|---|
| 1 | 388.315 | 1.9 | 25.40 | 1.80518 |
| 2 | 90.880 | 4.2 | | |
| 3 | 131.681 | 10.9 | 95.00 | 1.43875 |
| 4 | −222.805 | 6.7 | | |
| 5 | 80.481 | 11.7 | 67.87 | 1.59319 |
| 6 | −459.738 | 0.1 | | |
| 7 | 51.025 | 7.7 | 67.87 | 1.59319 |
| 8 | 107.456 | D8 | | |
| 9 | 237.466 | 0.9 | 35.72 | 1.90265 |
| 10 | 12.300 | 5.0 | | |
| 11 | −35.562 | 3.8 | 23.01 | 1.86074 |
| 12 | −11.797 | 0.9 | 39.82 | 1.86994 |
| 13* | 46.480 | 0.1 | | |
| 14 | 36.433 | 4.5 | 30.83 | 1.61750 |
| 15 | −19.932 | 1.1 | | |
| 16 | −15.104 | 0.9 | 52.30 | 1.74810 |
| 17 | −25.775 | D17 | | |
| 18 | −26.690 | 0.9 | 43.35 | 1.84042 |
| 19 | 46.065 | 3.0 | 23.01 | 1.86074 |
| 20 | −122.811 | D20 | | |
| 21 | −225.478 | 5.2 | 82.52 | 1.49782 |
| 22 | −35.180 | 2.0 | | |
| AS | ∞ | 1.0 | | |
| 24 | 72.778 | 4.2 | 65.77 | 1.46450 |
| 25 | −172.682 | 0.1 | | |
| 26 | 48.330 | 7.3 | 65.77 | 1.46450 |
| 27 | −46.694 | 1.7 | 35.72 | 1.90265 |
| 28 | −124.377 | 38.2 | | |
| 29 | 44.183 | 6.2 | 65.77 | 1.46450 |
| 30 | −44.183 | 0.7 | | |
| 31 | −49.910 | 1.5 | 39.82 | 1.86994 |
| 32 | 27.139 | 6.5 | 58.90 | 1.51823 |
| 33 | −60.477 | 0.1 | | |
| 34 | 81.052 | 6.2 | 45.87 | 1.54814 |
| 35 | −33.499 | 1.5 | 39.82 | 1.86994 |
| 36 | −279.134 | 0.1 | | |
| 37 | 31.496 | 5.2 | 65.77 | 1.46450 |
| 38 | −143.592 | 10.0 | | |
| 39 | ∞ | 30.0 | 38.03 | 1.60342 |
| 40 | ∞ | 16.2 | 64.10 | 1.51680 |
| 41 | ∞ | $B_f$ =2.0 | | |

TABLE 2

(Aspherical Face Data)

| S | Coefficient | Value |
|---|---|---|
| 13* | k | 4.7351 |
| | $C_2$ | 0.0000 |
| | $C_4$ | −3.20220 × 10⁻⁵ |

TABLE 2-continued (Aspherical Face Data)

| S | Coefficient | Value |
|---|---|---|
| | $C_6$ | $4.28370 \times 10^{-8}$ |
| | $C_8$ | $-1.46230 \times 10^{-9}$ |
| | $C_{10}$ | $6.19420 \times 10^{-12}$ |

TABLE 3

(Variable Interval in Variable Magnification)

| Variable | WAM | MFLM | TM |
|---|---|---|---|
| f | 8.30 | 40.00 | 174.30 |
| D8 | 0.78 | 35.97 | 48.64 |
| D17 | 49.54 | 7.92 | 3.72 |
| D20 | 3.83 | 10.26 | 1.79 |

TABLE 4

(Values Corresponding to Conditions)

| Parameter or Condition | Value |
|---|---|
| V | 21 |
| h | 17 |
| $10^{-4} \cdot h/2$ | 0.00085 |
| $|d \times 5|$ | 0.0088 |
| $|d \times 7|$ | 0.0370 |
| $|d \times 10|$ | 0.1518 |
| $10^{-1} \cdot h/2$ | 0.85 |
| $(R_2 + R_1)/(R_2 - R_1)$ | -1.61 |
| $(F_T/\#)^{1/2}(f_1/f_T)$ | 0.64 |
| $|\beta_{2w} \cdot V^{1/2}|$ | 1.08 |

With respect to Working Example 1, FIGS. 2A(I–III), 2B(I–III), and 2C(I–III) show plots corresponding to wide-angle, mid-focal length, and telephoto modes, respectively, for spherical aberration (3A(I), 3B(I), and 3C(I)), astigmatism (3A(II), 3B(II), and 3C(II)), and distortion (3A(III), 3B(III), and 3C(III)). As is clear from the foregoing plots, the configuration of this Working Example is well-corrected for aberrations over the entire range of focal lengths and is suitable for achieving the objectives of the present invention.

Working Example 2

Figure 3:
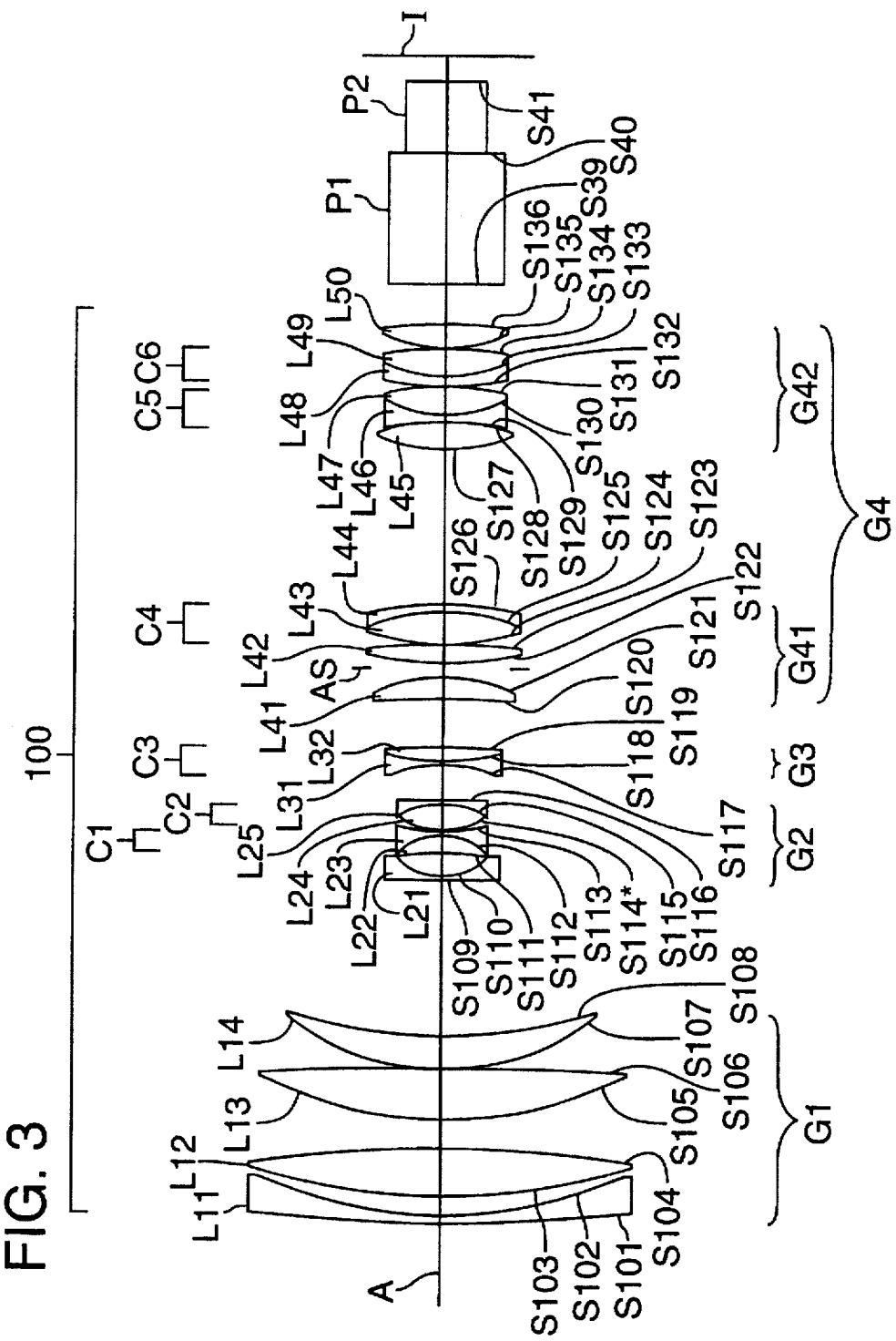
FIG. 3 is an optical diagram of the embodiment of Working Example 2.

FIG. 3 depicts an optical diagram of the embodiment 100 of the Working Example 2 in the extreme wide-angle mode.

The first lens group G1 comprises a negative meniscus lens element L11 having an objectwise convex surface S101, a bi-convex lens element L12, a bi-convex lens element L13, and a positive meniscus lens element L14 having an objectwise convex surface S107.

The second lens group G2 comprises a negative meniscus lens element L21 having an objectwise convex surface S109, a first compound lens C1 including a positive meniscus lens element L22 with an objectwise concave surface S111 and a bi-concave lens element L23, and a second compound lens C2 including a bi-convex lens element L24 with an objectwise aspherical surface S114* and a negative meniscus lens element L25 with a cemented objectwise concave surface S115.

The third lens group G3 comprises a compound lens C3 including a bi-concave lens element L31 and an bi-convex lens element L32.

The fourth lens group G4 comprises an objectwise lens subgroup G41 comprising a positive meniscus lens element L41 with an objectwise concave surface S120, an aperture stop AS, a biconvex lens element L42, and a compound lens C4 including a biconvex lens element L43 and a negative meniscus lens element L44 with a cemented objectwise concave surface S125.

The fourth lens group G4 further comprises an imagewise lens subgroup G42 comprising a bi-convex lens element L45, a first compound lens element C5 including a bi-concave lens element L46 and a bi-convex lens element L47, a second compound lens C6 including a negative meniscus lens element L48 having an objectwise convex surface S132 and a bi-convex lens element L49, and a bi-convex lens element L50.

With respect to Working Example 2, the various optical parameters are listed in Tables 5–8, below.

TABLE 5 f = 8.7–40–160.5 mm (WAM to MFLM to TM)

| S | R | D | $V_d$ | n |
|---|---|---|---|---|
| 101 | 403.360 | 1.9 | 25.40 | 1.80518 |
| 102 | 91.882 | 4.2 | | |
| 103 | 132.324 | 10.9 | 95.00 | 1.43875 |
| 104 | -222.998 | 6.6 | | |
| 105 | 81.476 | 11.7 | 67.87 | 1.59319 |
| 106 | -474.702 | 0.1 | | |
| 107 | 51.069 | 7.7 | 67.87 | 1.59319 |
| 108 | 110.671 | D108 | | |
| 109 | 195.336 | 0.9 | 35.72 | 1.90265 |
| 110 | 12.605 | 5.0 | | |
| 111 | -43.411 | 2.5 | 23.01 | 1.86074 |
| 112 | -20.623 | 0.9 | 52.30 | 1.74810 |
| 113 | 56.492 | 0.1 | | |
| 114* | 29.987 | 5.5 | 30.83 | 1.61750 |
| 115 | -12.959 | 0.9 | 52.30 | 1.74810 |
| 116 | -206.769 | D116 | | |
| 117 | -28.530 | 0.9 | 43.35 | 1.84042 |
| 118 | 34.764 | 3.0 | 23.01 | 1.86074 |
| 119 | -172.566 | D119 | | |
| 120 | -672.656 | 5.2 | 82.52 | 1.49782 |
| 121 | -32.414 | 2.0 | | |
| AS | ∞ | 1.0 | | |
| 122 | 75.164 | 4.2 | 65.77 | 1.46450 |
| 123 | -112.760 | 0.1 | | |
| 124 | 49.734 | 7.3 | 65.77 | 1.46450 |
| 125 | -46.734 | 1.7 | 35.72 | 1.90265 |
| 126 | -256.468 | 34.8 | | |
| 127 | 40.651 | 6.2 | 65.77 | 1.46450 |
| 128 | -40.651 | 0.7 | | |
| 129 | -48.731 | 1.5 | 39.82 | 1.86994 |
| 130 | 26.718 | 6.5 | 58.90 | 1.51823 |
| 131 | -63.520 | 0.1 | | |
| 132 | 280.707 | 1.5 | 39.82 | 1.86994 |
| 133 | 27.612 | 6.2 | 45.87 | 1.54814 |
| 134 | -93.049 | 0.1 | | |
| 135 | 26.382 | 5.2 | 65.77 | 1.46450 |
| 136 | -181.266 | 10.0 | | |
| 39 | ∞ | 30.0 | 38.03 | 1.60342 |
| 40 | ∞ | 16.2 | 64.10 | 1.51680 |
| 41 | ∞ | $B_f$ =4.1 | | |

TABLE 6

(Aspherical Face Data)

| S | Coefficient | Value |
|---|---|---|
| 114* | k | -0.0908 |
| | $C_2$ | 0.0000 |
| | $C_4$ | $2.74920 \times 10^{-5}$ |
| | $C_6$ | $5.38790 \times 10^{-8}$ |

TABLE 6-continued (Aspherical Face Data)

| S | Coefficient | Value |
|---|---|---|
| | $C_8$ | $-7.33200 \times 10^{-11}$ |
| | $C_{10}$ | $7.03290 \times 10^{-13}$ |

TABLE 7

(Variable Interval in Variable Magnification)

| Variable | WAM | MFLM | TM |
|---|---|---|---|
| f | 8.70 | 40.00 | 160.50 |
| D108 | 1.78 | 35.38 | 47.67 |
| D116 | 50.28 | 10.48 | 5.48 |
| D119 | 3.95 | 10.15 | 2.85 |

TABLE 8

(Values Corresponding to Conditions)

| Parameter or Condition | Value |
|---|---|
| V | 18.45 |
| h | 17.6 |
| $10^{-4} \cdot h/2$ | 0.00088 |
| |d × 5| | 0.0088 |
| |d × 7| | 0.0331 |
| |d × 10| | 0.1576 |
| $10^{-1} \cdot h/2$ | 0.88 |
| $(R_2 + R_1)/(R_2 - R_1)$ | $-1.59$ |
| $(F_T/\#)^{1/2}(f_1/f_T)$ | 0.67 |
| $|\beta_{2w} \cdot V^{1/2}|$ | 1.04 |

With respect to this Working Example, FIGS. 4A(I–III), 4B(I–III) and 4C(I–III) show plots corresponding to wide-angle, mid-focal length, and telephoto modes, respectively, for spherical aberration (4A(I), 4B(I), and 4C(I)), astigmatism (4A(II), 4B(II), and 4C(II)), and distortion (4A(III), 4B(III), and 4C(III)). As is clear from the foregoing plots, the configuration of this Working Example is well-corrected for aberrations over the entire range of focal lengths and is suitable for achieving the objectives of the present invention.

Working Example 3

Figure 5:
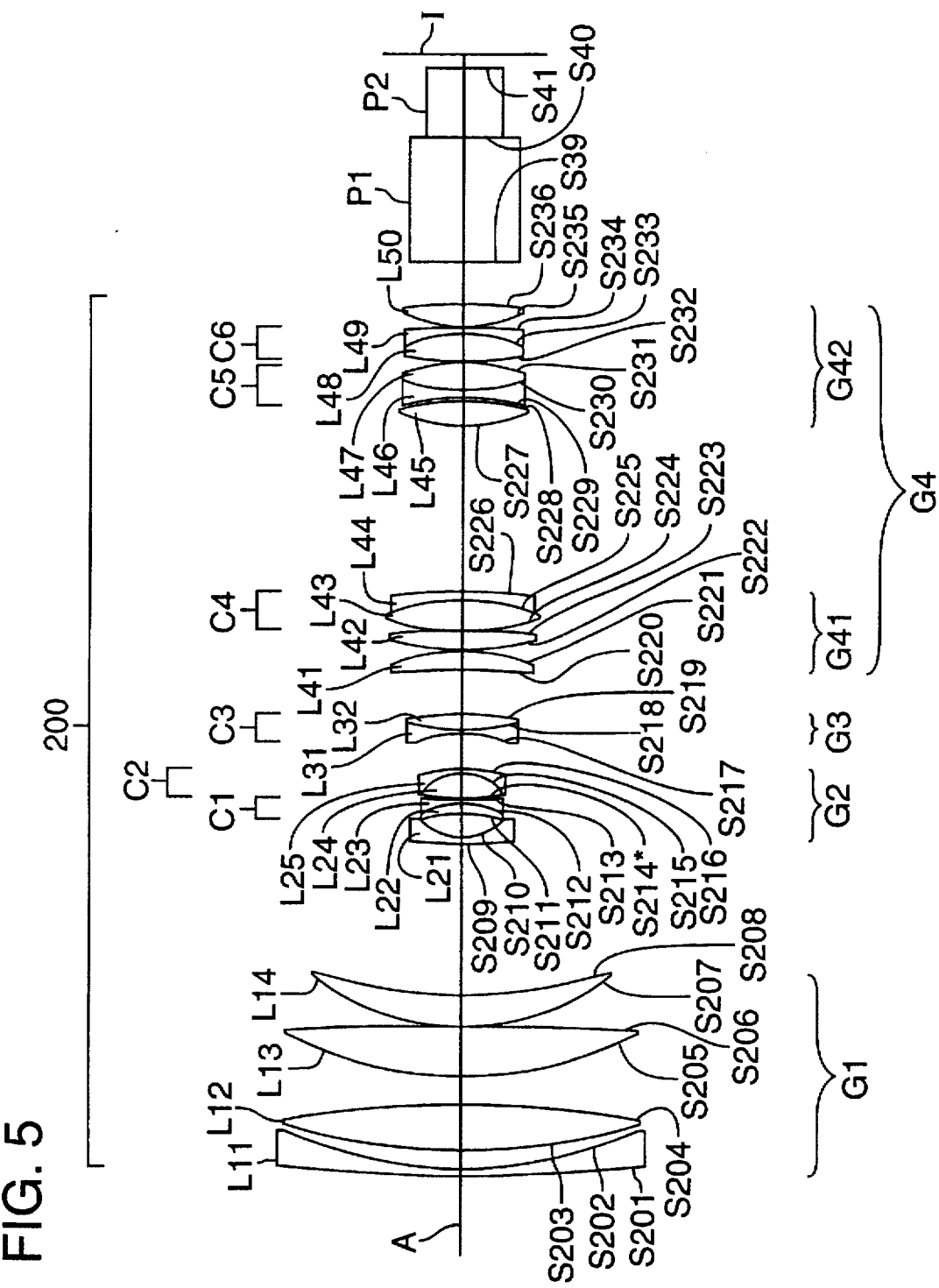
FIG. 5 is an optical diagram of the embodiment of Working Example 3.

FIG. 5 depicts an optical diagram of the embodiment 200 of the Working Example 3 in the extreme wide-angle mode.

The first lens group G1 comprises a negative meniscus lens element L11 having an objectwise convex surface S201, a bi-convex lens element L12, a bi-convex lens element L13, and a positive meniscus lens element L14 having an objectwise convex surface S207.

The second lens group G2 comprises a negative meniscus lens element L21 having an objectwise convex surface S209, a first compound lens C1 including a positive meniscus lens element L22 with an objectwise concave surface S211 and a bi-concave lens element L23, and a second compound lens C2 including a bi-convex lens element L24 with an objectwise aspherical surface S214 and a negative meniscus lens element L25 with a cemented objectwise concave surface S215.

The third lens group G3 comprises a compound lens C3 including a bi-concave lens element L31 and an bi-convex lens element L32.

The fourth lens group G4 comprises an objectwise lens subgroup G41 comprising a positive meniscus lens element L41 with an objectwise concave surface S220, a biconvex lens element L42, and a compound lens C4 including a biconvex lens element L43 and a negative meniscus lens element L44 with a cemented objectwise concave surface S225.

The fourth lens group G4 further comprises an imagewise lens subgroup G42 comprising a bi-convex lens element L45, a first compound lens C5 including a bi-concave lens element L46 and a bi-convex lens element L47, a second compound lens C6 including a biconvex lens element L48 and a negative meniscus lens element L49 having a cemented objectwise convex surface S233, and a bi-convex lens element L50.

The embodiment 200 of working example 3 does not have an aperture stop.

With respect to Working Example 3, the various optical parameters are listed in Tables 9–12, below.

TABLE 9 f = 8.3–40–160 mm (WAM to MFLM to TM)

| S | R | D | $V_d$ | n |
|---|---|---|---|---|
| 201 | 396.150 | 1.9 | 25.40 | 1.80518 |
| 202 | 91.964 | 4.2 | | |
| 203 | 131.505 | 10.9 | 95.00 | 1.43875 |
| 204 | −230.091 | 7.1 | | |
| 205 | 82.300 | 11.7 | 67.87 | 1.59319 |
| 206 | −484.521 | 0.1 | | |
| 207 | 51.650 | 7.7 | 67.87 | 1.59319 |
| 208 | 116.324 | D208 | | |
| 209 | 286.467 | 0.9 | 35.72 | 1.90265 |
| 210 | 12.400 | 5.0 | | |
| 211 | −43.710 | 2.5 | 23.01 | 1.86074 |
| 212 | −19.049 | 0.9 | 39.82 | 1.86994 |
| 213 | 44.743 | 0.1 | | |
| 214* | 28.082 | 5.5 | 30.83 | 1.61750 |
| 215 | −11.529 | 0.9 | 52.30 | 1.74810 |
| 216 | −50.436 | D216 | | |
| 217 | −26.380 | 0.9 | 43.35 | 1.84042 |
| 218 | 53.177 | 3.0 | 23.01 | 1.86074 |
| 219 | −116.233 | D219 | | |
| 220 | −291.474 | 5.2 | 82.52 | 1.49782 |
| 221 | −33.489 | 0.1 | | |
| 222 | 67.960 | 4.2 | 65.77 | 1.46450 |
| 223 | −134.652 | 0.1 | | |
| 224 | 47.587 | 7.3 | 65.77 | 1.46450 |
| 225 | −49.876 | 1.7 | 39.82 | 1.86994 |
| 226 | −322.705 | 39.3 | | |
| 227 | 42.553 | 6.2 | 65.77 | 1.46450 |
| 228 | −42.553 | 0.7 | | |
| 229 | −50.535 | 1.5 | 39.82 | 1.86994 |
| 230 | 27.853 | 6.5 | 58.90 | 1.51823 |
| 231 | −57.666 | 0.1 | | |
| 232 | 83.763 | 6.2 | 45.87 | 1.54814 |
| 233 | −31.209 | 1.5 | 39.82 | 1.86994 |
| 234 | −243.372 | 0.1 | | |
| 235 | 31.699 | 5.2 | 65.77 | 1.46450 |
| 236 | −145.209 | 10.0 | | |
| 39 | ∞ | 30.0 | 38.03 | 1.60342 |
| 40 | ∞ | 16.2 | 64.10 | 1.51680 |
| 41 | ∞ | $B_f = 1.2$ | | |

TABLE 10

(Aspherical Face Data)

| S | Coefficient | Value |
|---|---|---|
| 214* | k | 0.9992 |
| | $C_2$ | 0.0000 |

TABLE 10-continued (Aspherical Face Data)

| S | Coefficient | Value |
|---|---|---|
| | $C_4$ | $-1.70940 \times 10^{-5}$ |
| | $C_6$ | $-2.98670 \times 10^{-8}$ |
| | $C_8$ | $-3.26520 \times 10^{-10}$ |
| | $C_{10}$ | $-1.44640 \times 10^{-12}$ |

TABLE 11

(Variable Interval in Variable Magnification)

| Variable | WAM | MFLM | TM |
|---|---|---|---|
| f | 8.30 | 40.00 | 160.00 |
| D208 | 0.80 | 35.99 | 48.27 |
| D216 | 51.16 | 9.54 | 4.52 |
| D219 | 4.76 | 11.19 | 3.93 |

TABLE 12

(Values Corresponding to Conditions)

| Parameter or Condition | Value |
|---|---|
| V | 19.3 |
| h | 17 |
| $10^{-4} \cdot h/2$ | 0.00085 |
| kd × 5l | 0.0058 |
| kd × 7l | 0.0254 |
| kd × 10l | 0.1122 |
| $10^{-1} \cdot h/2$ | 0.85 |
| $(R_2 + R_1)/(R_2 - R_1)$ | -1.61 |
| $(F_T/\#)^{1/2}(f_I/f_T)$ | 0.67 |
| $|\beta_{2w} \cdot V^{1/2}|$ | 1.03 |

With respect to Working Example 3, FIGS. 6A(I–III), 6B(I–III) and 6C(I–III) show plots corresponding to wide-angle, mid-focal length, and telephoto modes, respectively, for spherical aberration (6A(I), 6B(I), and 6C(I)), astigmatism (6A(II), 6B(II), and 6C(II)), and distortion (6A(III), 6B(III), and 6C(III)). As is clear from the foregoing plots, the configuration of this Working Example is well-corrected for aberrations over the entire range of focal lengths and is suitable for achieving the objectives of the present invention.

Working Example 4

Figure 7:
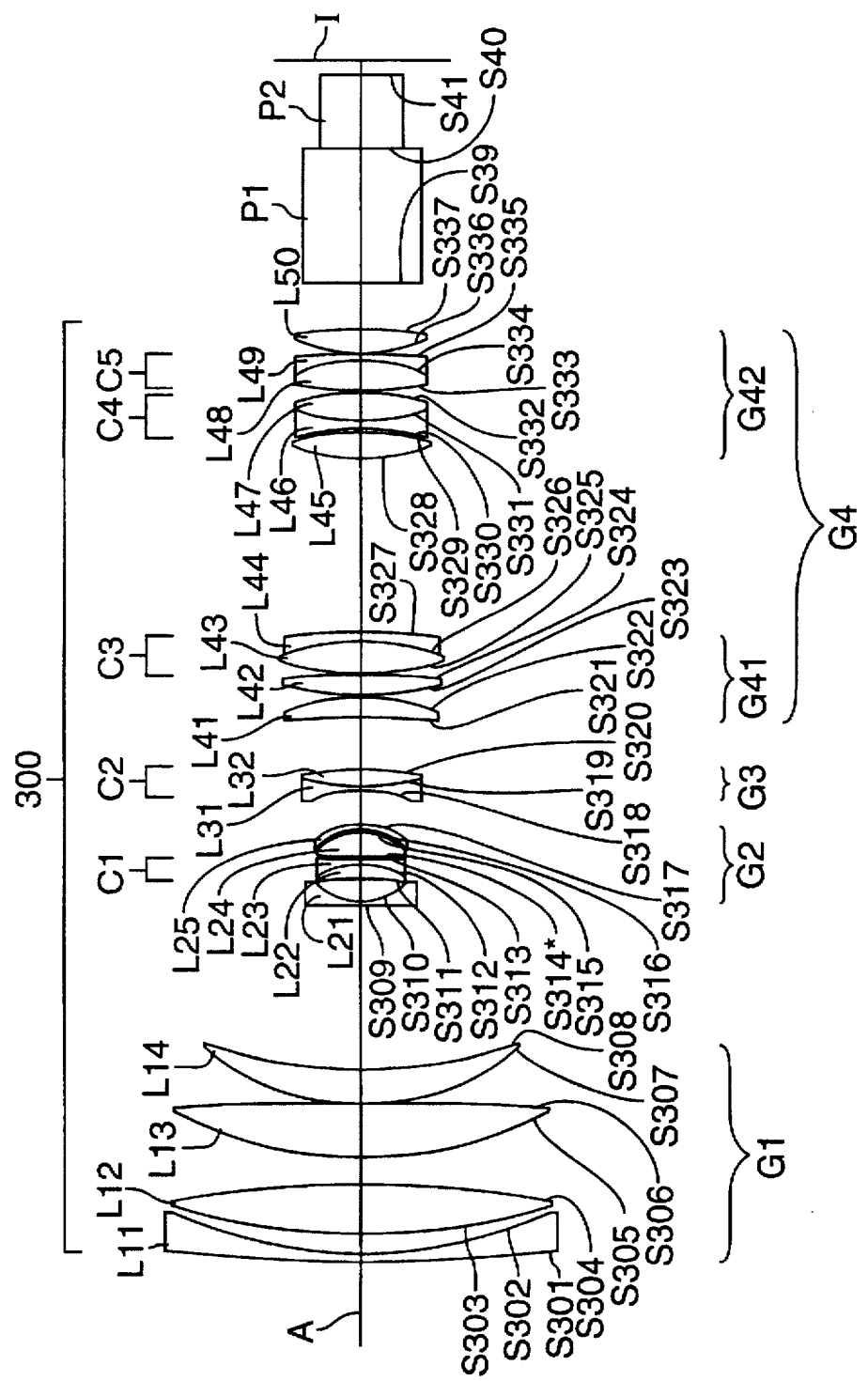
FIG. 7 is an optical diagram of the embodiment of Working Example 4.

FIG. 7 depicts an optical diagram of the embodiment 300 of the Working Example 4 in the extreme wide-angle mode.

The first lens group G1 comprises a negative meniscus lens element L11 having an objectwise convex surface S301, a bi-convex lens element L12, a bi-convex lens element L13, and a positive meniscus lens element L14 having an objectwise convex surface S307.

The second lens group G2 comprises a negative meniscus lens element L21 having an objectwise convex surface S309, a first compound lens C1 including a positive meniscus lens element L22 with an objectwise concave surface S311 and a bi-concave lens element L23, a biconvex lens element L24 with an objectwise aspherical surface S314* and a negative meniscus lens element L25 with an objectwise concave surface S316.

The third lens group G3 comprises a compound lens C2 comprising a bi-concave lens element L31 and an bi-convex lens element L32.

The fourth lens group G4 comprises an objectwise lens subgroup G41 comprising a positive meniscus lens element L41 with an objectwise concave surface S321, a biconvex lens element L42, and a compound lens C3 including a biconvex lens element L43 and a negative meniscus lens element L44 with a cemented objectwise concave surface S326.

The fourth lens group G4 further comprises an imagewise lens subgroup G42 comprising a bi-convex lens element L45, a first compound lens C4 including a bi-concave lens element L46 and a bi-convex lens element L47, a second compound lens C5 including a biconvex lens element L48 and a negative meniscus lens element L49 having a cemented objectwise concave surface S334, and a bi-convex lens element L50.

The embodiment 300 of Working Example 4 does not have an aperture stop.

With respect to Working Example 4, the various optical parameters are listed in Tables 13–16, below.

TABLE 13 f = 8.3–40–159.5 mm (WAM to MFLM to TM)

| S | R | D | $V_d$ | n |
|---|---|---|---|---|
| 301 | 383.957 | 1.9 | 25.40 | 1.80518 |
| 302 | 91.486 | 4.2 | | |
| 303 | 133.251 | 10.9 | 95.00 | 1.43875 |
| 304 | -227.181 | 7.0 | | |
| 305 | 80.972 | 11.7 | 67.87 | 1.59319 |
| 306 | -577.273 | 0.1 | | |
| 307 | 52.125 | 7.7 | 67.87 | 1.59319 |
| 308 | 121.281 | D308 | | |
| 309 | 160.773 | 0.9 | 35.72 | 1.90265 |
| 310 | 12.360 | 5.0 | | |
| 311 | -37.642 | 3.8 | 23.01 | 1.86074 |
| 312 | -11.661 | 0.9 | 39.82 | 1.86994 |
| 313 | 51.266 | 0.1 | | |
| 314* | 37.881 | 4.5 | 30.83 | 1.61750 |
| 315 | -24.653 | 1.1 | | |
| 316 | -16.695 | 0.9 | 52.30 | 1.74810 |
| 317 | -27.665 | D317 | | |
| 318 | -25.886 | 0.9 | 43.35 | 1.84042 |
| 319 | 62.087 | 3.0 | 23.01 | 1.86074 |
| 320 | -107.350 | D320 | | |
| 321 | -945.767 | 5.2 | 65.77 | 1.46450 |
| 322 | -31.151 | 0.1 | | |
| 323 | 66.881 | 4.2 | 65.77 | 1.46450 |
| 324 | -151.210 | 0.1 | | |
| 325 | 44.735 | 7.3 | 65.77 | 1.46450 |
| 326 | -50.724 | 1.7 | 39.82 | 1.86994 |
| 327 | -1558.650 | 38.7 | | |
| 328 | 42.553 | 6.2 | 65.77 | 1.46450 |
| 329 | -42.553 | 0.7 | | |
| 330 | -50.535 | 1.5 | 39.82 | 1.86994 |
| 331 | 27.853 | 6.5 | 58.90 | 1.51823 |
| 332 | -57.666 | 0.1 | | |
| 333 | 83.763 | 6.2 | 45.87 | 1.54814 |
| 334 | -31.209 | 1.5 | 39.82 | 1.86994 |
| 335 | -243.372 | 0.1 | | |
| 336 | 31.669 | 5.2 | 65.77 | 1.46450 |
| 337 | -145.209 | 10.0 | | |
| 38 | ∞ | 30.0 | 38.03 | 1.60342 |
| 39 | ∞ | 16.2 | 64.10 | 1.51680 |
| 40 | ∞ | $B_f$ =1.2 | | |

TABLE 14

(Aspherical Face Data)

| S | Coefficient | Value |
|---|---|---|
| 314* | k | 0.5585 |
| | $C_2$ | 0.0000 |

TABLE 14-continued (Aspherical Face Data)

| S | Coefficient | Value |
|---|---|---|
| | $C_4$ | $2.88860 \times 10^{-5}$ |
| | $C_6$ | $2.99520 \times 10^{-8}$ |
| | $C_8$ | $-2.76610 \times 10^{-10}$ |
| | $C_{10}$ | $7.03290 \times 10^{-13}$ |

TABLE 15

(Variable Interval in Variable Magnification)

| Variable | WAM | MFLM | TM |
|---|---|---|---|
| f | 8.30 | 40.00 | 159.50 |
| D308 | 0.71 | 35.90 | 48.17 |
| D317 | 50.13 | 8.51 | 3.46 |
| D320 | 5.36 | 11.79 | 4.57 |

TABLE 16

(Values Corresponding to Conditions)

| Parameter or Condition | Value |
|---|---|
| V | 19.2 |
| h | 17.6 |
| $10^{-4} \cdot h/2$ | 0.00088 |
| kd × 5I | 0.0106 |
| kd × 7I | 0.040 |
| kd × 10I | 0.173 |
| $10^{-1} \cdot h/2$ | 0.88 |
| $(R_2 + R_1)/(R_2 - R_1)$ | -1.28 |
| $(F_T/\#)^{1/2}(f_1/f_T)$ | 0.67 |
| $|\beta_{2w} \cdot V^{1/2}|$ | 1.03 |

With respect to Working Example 4, FIGS. 8A(I–III), 8B(I–III) and 8C(I–III) show plots corresponding to wide-angle, mid-focal length, and telephoto modes, respectively, for spherical aberration (8A(I), 8B(I), and 8C(I)), astigmatism (8A(II), 8B(II), and 8C(II)), and distortion (8A(III), 8B(III), and 8C(III)). As is clear from the foregoing plots, the configuration of Working Example 4 is well-corrected for aberrations over the entire range of focal lengths and is suitable for achieving the objectives of the present invention.

Working Example 5

Figure 9:
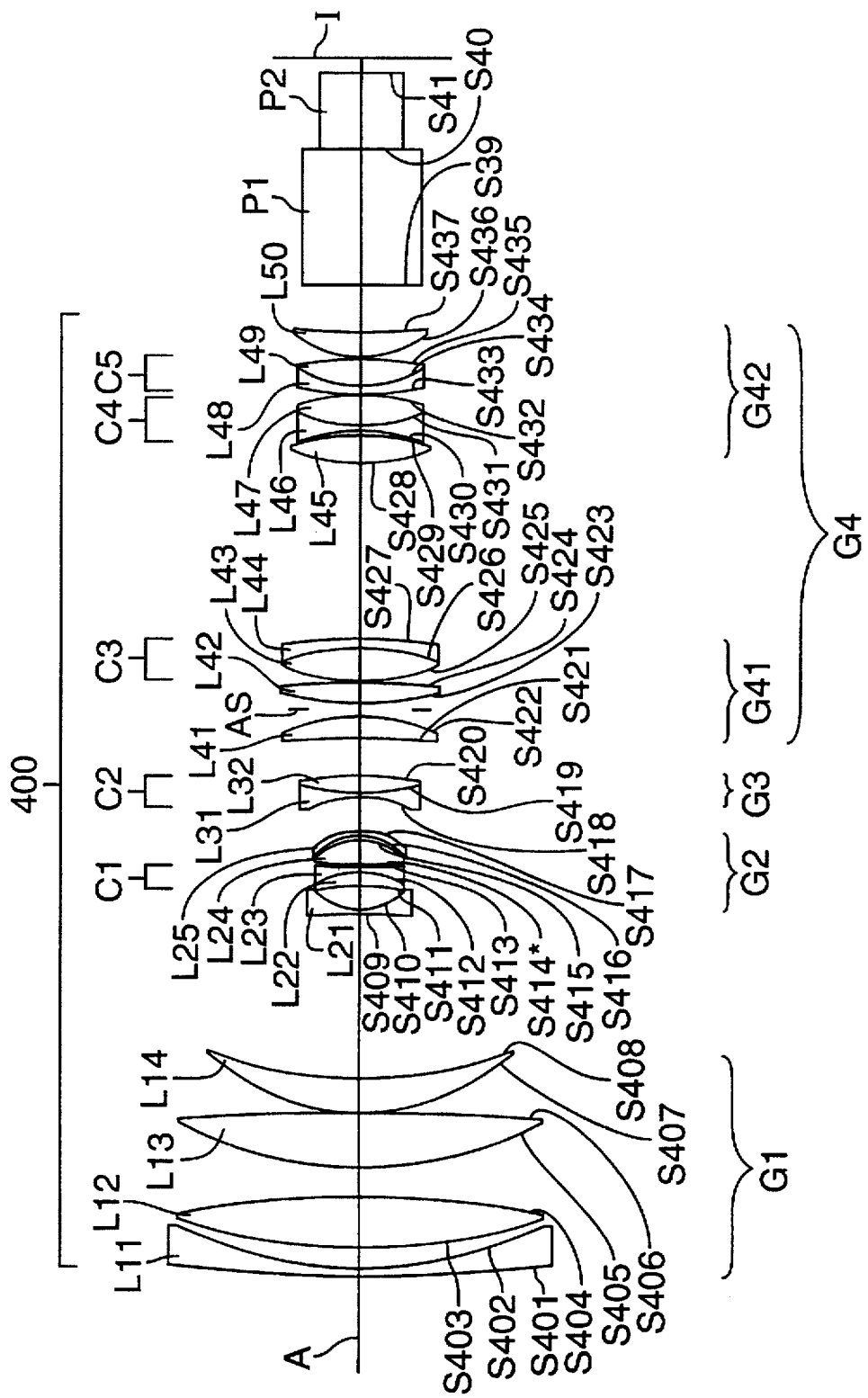
FIG. 9 is an optical diagram of the embodiment of Working Example 5.

FIG. 9 depicts an optical diagram of the embodiment 400 of the Working Example 5 in the extreme wide-angle mode.

The first lens group G1 comprises a negative meniscus lens element L11 having an objectwise convex surface S401, a bi-convex lens element L12, a bi-convex lens element L13, and a positive meniscus lens element L14 having an objectwise convex surface S407.

The second lens group G2 comprises a biconcave lens element L21, a compound lens C1 including a positive meniscus lens element L22 with an objectwise concave surface S411 and a bi-concave lens element L23, a biconvex lens element L24 with an objectwise aspherical surface S414*, and a negative meniscus lens element L25 with an objectwise concave aspherical surface S416*.

The third lens group G3 comprises a compound lens C2 including a bi-concave lens element L31 and an bi-convex lens element L32.

The fourth lens group G4 comprises an objectwise lens subgroup G41 comprising a positive meniscus lens element L41 with an objectwise concave surface S421, aperture stop AS, a biconvex lens element L42, and a compound lens C3 including a biconvex lens element L43 and a negative meniscus lens element L44 with a cemented objectwise concave surface S426.

The fourth lens group G4 further comprises an imagewise lens subgroup G42 comprising a bi-convex lens element L45, a first compound lens C4 including a bi-concave lens element L46 and a bi-convex lens element L47, a second compound lens C5 including a negative meniscus lens element L48 with an objectwise convex surface S433 and a biconvex lens element L49, and a positive meniscus lens element L50 with an objectwise convex surface S436.

With respect to Working Example 5, the various optical parameters are listed in Tables 17–20, below.

TABLE 17 f = 8.3–40–160 mm (WAM to MFLM to TM)

| S | R | D | $V_d$ | n |
|---|---|---|---|---|
| 401 | 400.131 | 1.9 | 25.40 | 1.80518 |
| 402 | 91.228 | 4.2 | | |
| 403 | 130.81 | 10.9 | 95.00 | 1.43875 |
| 404 | -222.345 | 6.5 | | |
| 405 | 80.804 | 11.7 | 67.87 | 1.59319 |
| 406 | -471.956 | 0.1 | | |
| 407 | 51.014 | 7.7 | 67.87 | 1.59319 |
| 408 | 108.805 | D408 | | |
| 409 | -292.078 | 0.9 | 35.72 | 1.90265 |
| 410 | 11.825 | 5.0 | | |
| 411 | -138.188 | 3.8 | 23.01 | 1.86074 |
| 412 | -19.344 | 0.9 | 39.82 | 1.86994 |
| 413 | 25.376 | 0.1 | | |
| 414* | 31.720 | 4.5 | 30.83 | 1.61750 |
| 415 | -14.797 | 1.1 | | |
| 416* | -12.651 | 0.9 | 52.30 | 1.74810 |
| 417 | -24.293 | D417 | | |
| 418 | -26.295 | 0.9 | 43.35 | 1.84042 |
| 419 | 44.949 | 3.0 | 23.01 | 1.86074 |
| 420 | -115.757 | D420 | | |
| 421 | -1114.319 | 5.2 | 82.52 | 1.49782 |
| 422 | -32.117 | 2.0 | | |
| AS | ∞ | 1.0 | | |
| 423 | 79.950 | 4.2 | 65.77 | 1.46450 |
| 424 | -743.870 | 0.1 | | |
| 425 | 49.486 | 7.3 | 65.77 | 1.46450 |
| 426 | -37.770 | 1.7 | 35.72 | 1.90265 |
| 427 | -89.366 | 38.0 | | |
| 428 | 42.553 | 6.2 | 65.77 | 1.46450 |
| 429 | -42.553 | 0.7 | | |
| 430 | -51.168 | 1.5 | 39.82 | 1.86994 |
| 431 | 27.086 | 6.5 | 58.90 | 1.51823 |
| 432 | -69.617 | 0.1 | | |
| 433 | 82.057 | 1.5 | 39.82 | 1.86994 |
| 434 | 27.797 | 6.2 | 45.87 | 1.54814 |
| 435 | -181.835 | 0.1 | | |
| 436 | 24.640 | 5.2 | 65.77 | 1.46450 |
| 437 | 208.276 | 10.0 | | |
| 39 | ∞ | 30.0 | 38.03 | 1.60342 |
| 40 | ∞ | 16.2 | 64.10 | 1.51680 |
| 41 | ∞ | $B_f$ =1.7 | | |

TABLE 18

(Aspherical Face Data)

| S | Coefficient | Value |
|---|---|---|
| 414* | k | 1.0000 |
| | $C_2$ | 0.0000 |
| | $C_4$ | $3.78990 \times 10^{-5}$ |
| | $C_6$ | $3.03410 \times 10^{-7}$ |
| | $C_8$ | $-3.22950 \times 10^{-9}$ |

TABLE 18-continued (Aspherical Face Data)

| S | Coefficient | Value |
|---|---|---|
|  | $C_{10}$ | $1.25000 \times 10^{-11}$ |
| 416* | k | 1.0000 |
|  | $C_2$ | 0.0000 |
|  | $C_4$ | $3.40000 \times 10^{-5}$ |
|  | $C_6$ | $-1.23470 \times 10^{-7}$ |
|  | $C_8$ | $4.48560 \times 10^{-9}$ |
|  | $C_{10}$ | $-1.09190 \times 10^{-11}$ |

TABLE 19

(Variable Interval in Variable Magnification)

| Variable | WAM | MFLM | TM |
|---|---|---|---|
| f | 8.30 | 40.00 | 160.00 |
| D408 | 1.10 | 36.29 | 48.56 |
| D417 | 49.36 | 7.74 | 2.72 |
| D420 | 2.44 | 8.87 | 1.61 |

TABLE 20

(Values Corresponding to Conditions)

| Parameter or Condition | Value |
|---|---|
| V | 19.3 |
| S = 414*: |  |
| h | 17.6 |
| $10^{-4} \cdot h/2$ | 0.00088 |
| $|d \times 5|$ | 0.0160 |
| $|d \times 7|$ | 0.0712 |
| $|d \times 10|$ | 0.2869 |
| $10^{-1} \cdot h/2$ | 0.88 |
| S = 416*: |  |
| h | 18 |
| $10^{-4} \cdot h/2$ | 0.0009 |
| $|d \times 5|$ | 0.0136 |
| $|d \times 7|$ | 0.0611 |
| $|d \times 10|$ | 0.3125 |
| $10^{-1} \cdot h/2$ | 0.9 |
| $(R_2 + R_1)/(R_2 - R_1)$ | -1.59 |
| $(F_T/\#)^{1/2}(f_1/f_T)$ | 0.67 |
| $|\beta_{2W} \cdot V^{1/2}|$ | 1.03 |

With respect to Working Example 5, FIGS. 10A(I–III), 10B(I–III) and 10C(I–III) show plots corresponding to wide-angle, mid-focal length, and telephoto modes, respectively, for spherical aberration (10A(I), 10B(I), and 10C(I)), astigmatism (10A(II), 10B(II), and 10C(II)), and distortion (10A (III), 10B(III), and 10C(III)). As is clear from the foregoing plots, the configuration of Working Example 5 is well-corrected for aberrations over the entire range of focal lengths and is suitable for achieving the objectives of the present invention.

While the present invention has been described in connection with preferred embodiments, it will be understood that it is not limited to those embodiments. On the contrary, it is intended to cover all alternatives, modifications, and equivalents as may be included within the spirit and scope of the invention as defined in the appended claims.

What is claimed is:

1. A zoom lens for a camera, the zoom lens comprising objectwise to imagewise along an optical axis:

(a) first, second, third, and fourth lens groups having positive, negative, negative, and positive refractive power, respectively;

(b) the second and third lens groups being axially movable for zooming so as to provide the zoom lens with a focal-length range from a wide-angle mode to a telephoto mode over a zooming ratio V of at least 16; and (c) the second lens group comprising an aspherical lens element having a maximum effective diameter h and an aspherical lens surface having departure distances $d \times 5$, $d \times 7$, and $d \times 10$ satisfying the relationship:

$$10^{-4} \cdot (h/2) < |d \times 5| < |d \times 7| < |d \times 10| < 10^{-1} \cdot (h/2) 1.$$

2. A zoom lens according to claim 1, wherein the first lens group has a focal length $f_1$, the second lens group has a lateral magnification $\beta_{2W}$, the telephoto mode has a focal length $f_T$ and an F-number $F_T/\#$, the zoom lens satisfying at least one condition selected from a group consisting of:

$$0.5 < (F_T/\#)^{1/2}(f_1/f_T) < 1.0;$$

and $$0.9 < |\beta_{2W} V^{1/2}| < 1.5.$$

3. A zoom lens according to claim 2, wherein the first lens group comprises a most objectwise lens element having an objectwise spherical surface with radius of curvature $R_1$ and an imagewise spherical surface with radius of curvature $R_2$ satisfying the relationship:

$$-2.0 < (R_2+R_1)/(R_2-R_1) < 0.0.$$

4. A zoom lens according to claim 3 wherein the aspherical lens surface has a positive refractive power that increases with increasing radial distance from the optical axis.

5. A zoom lens according to claim 1, wherein the fourth lens group comprises an objectwise lens subgroup having positive refractive power, and an imagewise lens subgroup having positive refractive power.

6. A zoom lens according to claim 5, further comprising an aperture stop disposed in the objectwise lens subgroup of the fourth lens group.

7. A zoom lens according to claim 1, further comprising an aperture stop disposed in the fourth lens group.

8. A zoom lens according to claim 1, wherein any of the second, third, and fourth lens groups comprises at least one compound lens.

9. A zoom lens according to claim 8, wherein the fourth lens group comprises at least two compound lenses.

10. In combination:

(a) a zoom lens according to claim 1 operable to produce an image, at an image plane, of an illuminated object; and (b) sensing means disposed so as to sense the image at the image plane.

11. A combination according to claim 10, further comprising a color-separating prism disposed coaxially between the zoom lens and the image plane.

12. A zoom lens for a camera, the zoom lens comprising objectwise to imagewise along an optical axis:

(a) a first lens group having a positive refractive power and a focal length $f_1$;

(b) a second lens group having negative refractive power and a lateral magnification $\beta_{2W}$;

(c) a third lens group having a negative refractive power;

(d) a fourth lens group having a positive refractive power;

(e) the zoom lens including at least one aspherical lens element with an aspherical surface, the aspherical surface having a maximum effective diameter h and aspherical lens-surface departure distances of d×5, d×7, and d×10;

(f) the second lens group being axially movable over a zooming range from a wide-angle mode to a telephoto mode so as to provide the zoom lens with a zoom ratio V, the telephoto mode having a focal length $f_T$ and an F-number $F_T/\#$; and (g) the zoom lens satisfying at least one condition selected from a group consisting of:

$$10^{-4} \cdot (h/2) < |d \times 5| < |d \times 7| < |d \times 10| < 10^{-1} \cdot (h/2);$$

$$0.5 < (F_T/\#)^{1/2}(f_1/f_T) < 1.0;$$

and $$0.9 < |\beta_{2W}| V^{1/2} < 1.5.$$

13. A zoom lens according to claim 12, wherein the first lens group comprises a most imagewise lens element having an objectwise surface with a radius of curvature $R_1$ and an imagewise surface with a radius of curvature $R_2$ satisfying the condition:

$$-2.0 < (R_2+R_1)/(R_2-R_1) < 0.0.$$

14. A zoom lens according to claim 12, wherein the zoom ratio satisfies the condition:

$$V > 16.$$

15. In combination:

(a) a zoom lens according to claim 12 operable to produce an image, at an image plane, of an illuminated object; and (b) sensing means disposed so as to sense the image at the image plane.

16. A combination according to claim 15, further comprising a color-separating prism disposed coaxially between the zoom lens and the image plane.

17. A zoom lens for a camera, the zoom lens comprising objectwise to imagewise:

(a) a first lens group having a positive refractive power and a focal length $f_1$, the first lens group comprising at least one positive lens element and a most imagewise negative lens element having an objectwise surface with a radius of curvature $R_1$ and an imagewise surface with a radius of curvature $R_2$;

(b) a second lens group having negative refractive power and a lateral magnification $\beta_{2W}$, and comprising an aspherical lens element;

(c) a third lens group having negative refractive power and comprising a compound lens;

(d) a fourth lens group having positive refractive power;

(e) the second and third lens groups being axially movable over respective zooming ranges from a wide-angle mode to a telephoto mode so as to provide the zoom lens to have a zoom ratio V, wherein the telephoto mode has a focal length $f_T$ and an F-number $F_T/\#$;

(f) the aspherical lens element having an aspherical refracting surface having a maximum effective diameter h and departure distances of d×5, d×7, and d×10; and (g) the zoom lens satisfying at least one condition selected from a group consisting of:

$$V > 16 \quad \text{(i)}$$

$$10^{-4} \cdot (h/2) < |d \times 5| < |d \times 7| < |d \times 10| < 10^{-1} \cdot (h/2) \quad \text{(ii)}$$

$$-2.0 < (R_2+R_1)/(R_2R_1) < 0.0 \quad \text{(iii)}$$

$$0.5 < (F_T/\#)^{1/2}(f_1/f_T) < 1.0 \quad \text{(iv)}$$

$$0.9 < |\beta_{2W}| V^{1/2} < 1.5. \quad \text{(v)}$$

18. A zoom lens according to claim 17, further comprising an aperture stop disposed coaxially imagewise of a first objectwise lens element in the fourth lens group.

19. A zoom lens according to claim 17, further comprising a cam operably engaged with the second lens group and the third lens group for effecting coordinated zooming movements of the second and third lens groups.

20. A zoom lens according to claim 17, having at least one of the following characteristics:

(a) the compound lens in the third lens group includes, objectwise to imagewise, a biconcave lens element and a biconvex lens element;

(b) the fourth lens group has an objectwise lens subgroup comprising a first compound lens, and an imagewise lens subgroup comprising a second compound lens; and (c) the fourth lens group includes an aperture stop.

21. In combination:

(a) a zoom lens according to claim 17 operable to produce an image, at an image plane, of an illuminated object; and (b) sensing means disposed so as to sense the image at the image plane.

22. A combination according to claim 21, further comprising a color-separating prism disposed coaxially between the zoom lens and the image plane.

23. A zoom lens that is capable of providing an image of an object at an image plane over a range of focal lengths from a wide-angle mode to a telephoto mode, the zoom lens comprising objectwise to imagewise:

(a) a first lens group having overall positive refractive power, the first lens group having a focal length $f_1$ and comprising a negative lens element and at least three positive lens elements, the most imagewise lens element of which group having an objectwise surface with a radius of curvature $R_1$ and an imagewise surface with a radius of curvature $R_2$;

(b) a second lens group comprising at least five lens elements wherein at least one of said lens elements has an aspherical surface, the second lens group having overall negative refractive power and a lateral magnification $\beta_{2W}$ whenever the zoom lens is used in a wide-angle mode;

(c) a third lens group comprising two lens elements and having overall negative refractive power;

(d) a fourth lens group comprising ten lens elements and having overall positive refractive power;

(e) the zoom lens exhibiting in the telephoto mode a focal length $f_T$ and an F-number $F_T/\#$; and (f) the zoom lens satisfying the condition:

$$0.5 < (F_T/\#)^{1/2}(f_1/f_T) < 1.0.$$

24. A zoom lens according to claim 23, further comprising an aperture stop disposed in the fourth lens group.

25. A zoom lens according to claim 23, wherein the second lens group exhibits a magnification in the wide-angle mode of $\beta_{2W}$, the zoom lens exhibiting a zooming ratio V satisfying the condition:

$$0.9 < |\beta 2_W \cdot V^{1/2} < 1.5.$$

26. A zoom lens according to claim 23, wherein the most imagewise lens element in the first lens group is a negative lens element having an objectwise surface and an imagewise surface, the objectwise surface having a radius of curvature $R_1$ and the imagewise surface having a radius of curvature $R_2$ satisfying the condition:

$$-2.0 < (R_2 + R_1)/(R_2 - R_1) < 0.0.$$

27. A zoom lens according to claim 23, having at least one of the following characteristics:

(a) the first lens group comprises, objectwise to imagewise, a negative meniscus lens element with an objectwise convex surface, a first biconvex lens element, a second biconvex lens element, and a positive meniscus lens element having an objectwise convex surface;

(b) the second lens group comprises, objectwise to imagewise, a negative biconcave lens element, a compound lens including a negative meniscus lens element and a biconcave lens element having an objectwise aspherical surface, an aspherical biconvex lens element, and a negative meniscus lens element having a concave objectwise surface;

(c) the third lens group comprises a compound lens including, objectwise to imagewise, a biconcave lens element, and a biconvex lens element; and (d) the fourth lens group comprises, objectwise to imagewise, (i) a positive meniscus lens element having an imagewise convex surface, (ii) a first biconvex lens element, (iii) a second biconvex lens element, (iv) a first negative meniscus lens element having an imagewise convex surface, (v) a third biconvex lens element, (vi) a first compound lens including a biconcave lens element and a fourth biconvex lens element, (vii) a second compound lens including one of (1) a fifth biconvex lens element and a second negative meniscus lens element having an objectwise concave surface, and (2) a second negative meniscus lens element having an objectwise convex surface and a fifth biconvex lens element, and (viii) a sixth biconvex lens element.

28. A zoom lens according to claim 27, wherein the second lens group comprises, objectwise to imagewise, a negative biconcave lens element, a first compound lens including a negative meniscus lens element and a biconcave lens element having an objectwise aspherical surface, and a second compound lens including an aspherical biconvex lens element cemented to a negative meniscus lens element having a concave objectwise surface.

29. In combination:

(a) a zoom lens according to claim 23 operable to produce an image, at an image plane, of an illuminated object; and (b) sensing means disposed so as to sense the image at the image plane.

30. A combination according to claim 29, further comprising a color-separating prism disposed coaxially between the zoom lens and the image plane.

* * * * *

UNITED STATES PATENT AND TRADEMARK OFFICE
CERTIFICATE OF CORRECTION

PATENT NO. : 5,760,969

DATED : June 2, 1998

INVENTOR(S) : Takeshi Suzuki

It is certified that error appears in the above-identified patent and that said Letters Patent is hereby corrected as shown below:

Column 4, line 13, "$10^{-4} \cdot (h/2) < |dx5| < |dx7| < |dx10| < 10^{-1} \cdot (h/2);$" should be --$10^{-4} \cdot (h/2) < |dx5| < |dx7| < |dx10| < 10^{-1} \cdot (h/2);$--

Column 4, line 61, "$-2.0 < (R_2+R_1)/(R_2-R_1) < 00$" should be -- $-2.0 < (R_2 + R_1)/(R_2 - R_1) < 0.0$ --.

Column 7, line 44, "10" should be in bold print --10--.

Column 7, line 47, --present-- should be inserted after the first occurrence of "the" and before "invention".

Column 8, line 53, "$|dx5| < |dx7| < |dx10|$" should be --$|dx5| < |dx7| < |dx10|$--.

Column 10, line 25, --15-- should be deleted after "C3," and before "and".

Column 10, line 34, --25-- should be deleted after "positive" and before "overall".

Column 10, line 47 "prism Pi" should be --prism P1--.

Column 13, line 49, "100" should be in bold print --100--.

Column 15, line 49, "200" should be in bold print --200--.

Column 16, line 16, "200" should be in bold print --200--.

UNITED STATES PATENT AND TRADEMARK OFFICE
CERTIFICATE OF CORRECTION

PATENT NO. : 5,760,969

DATED : June 2, 1998

INVENTOR(S) : Takeshi Suzuki

It is certified that error appears in the above-identified patent and that said Letters Patent is hereby corrected as shown below:

Column 17, line 49, "300" should be in bold print --300--.

Column 17, line 59, "C1" should be in bold print --C1--.

Column 18, line 16, "300" should be in bold print --300--.

Column 19, line 49, "400" should be in bold print --400--.

In the Claims:

Column 22, line 14, "$10^{-4} \cdot (h/2) < |dx5| < |dx7| < |dx10| < 10^{-1} \cdot (h/2)\ 1.$" should be --$10^{-4} \cdot (h/2) < |dx5| < |dx7| < |dx10| < 10^{-1} \cdot (h/2)$.--

Column 24, line 7, "$-2.0 < (R_2 + R_1)/(R_2 R_1) < 0.0$" should be -- $-2.0 < (R_2 + R_1)/(R_2 - R_1) < 0.0$ --.

Column 25, line 5, "$0.9 < |\beta 2_w \cdot V^{1/2} < 1.5$" should be --$0.9 < |\beta 2_w \cdot V^{1/2}| < 1.5$--.

Signed and Sealed this

Fourteenth Day of September, 1999

Attest:

Q. TODD DICKINSON

*Attesting Officer*     *Acting Commissioner of Patents and Trademarks*